(12) United States Patent
Zhang et al.

(10) Patent No.: US 8,477,813 B2
(45) Date of Patent: *Jul. 2, 2013

(54) PHYSICAL LAYER DATA UNIT FORMAT

(75) Inventors: Hongyuan Zhang, Fremont, CA (US);
Rohit U. Nabar, Sunnyvale, CA (US);
Manyuan Shen, Milpitas, CA (US);
Songping Wu, Sunnyvale, CA (US);
Hui-Ling Lou, Sunnyvale, CA (US);
Yong Liu, Campbell, CA (US)

(73) Assignee: Marvell World Trade Ltd., St. Michael (BB)

( * ) Notice: Subject to any disclaimer, the term of this patent is extended or adjusted under 35 U.S.C. 154(b) by 750 days.

This patent is subject to a terminal disclaimer.

(21) Appl. No.: 12/548,205

(22) Filed: Aug. 26, 2009

(65) Prior Publication Data

US 2010/0054223 A1 Mar. 4, 2010

Related U.S. Application Data

(60) Provisional application No. 61/091,909, filed on Aug. 26, 2008.

(51) Int. Cl.
*H04J 3/06* (2006.01)
(52) U.S. Cl.
USPC ............ 370/510; 370/338; 375/135; 375/146
(58) Field of Classification Search
USPC .. 375/130, 134, 145, 260, 135, 146; 370/208, 370/209, 210, 328, 338, 231, 334, 350, 436, 370/503, 509, 510, 511, 512, 513, 514; 455/13.3, 24
See application file for complete search history.

(56) References Cited

U.S. PATENT DOCUMENTS

2008/0045153 A1* 2/2008 Surineni et al. ............. 455/63.1

FOREIGN PATENT DOCUMENTS

WO WO2007/040564 A1 4/2007

OTHER PUBLICATIONS

International Search Report in corresponding PCT/US2009/055069 mailed Mar. 3, 2011.
Written Opinion in corresponding PCT/US2009/055069 mailed Mar. 3, 2011.
International Preliminary Report on Patentability in corresponding PCT/US2009/055069 mailed Mar. 17, 2011.
Funada et al., "A design of single carried based Phy for IEEE 802.15.3c standard," 18th Annual IEEE International Symposium on Personal, Indoor and Mobile Radio Communications (PIMRC'07), 5 pages 2007.

(Continued)

*Primary Examiner* — Dady Chery

(57) ABSTRACT

In a wireless communication system wherein communication devices exchange information utilizing data units that conform to a first format, a beamforming training (BFT) data unit that conforms to a second format is transmitted, wherein a length of the BFT data unit is shorter than lengths supported by the first format, wherein the BFT data unit is for transmitting PHY beamforming training information. Information to indicate the BFT data unit conforms to the second format is transmitted to a receiving device. The BFT data unit is generated according to the second format, wherein the BFT data unit includes BFT information elements. The BFT data unit is then transmitted to the receiving device.

23 Claims, 33 Drawing Sheets

OTHER PUBLICATIONS

IEEE Std 802.15.3c/D00 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2008).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.* (1999).

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.* (2001).

"IEEE 802.15.3™ Guide Addresses Untapped High-Rate Wireless Personal Area Network (WPAN) Market," *The Institute of Electrical and Electronics Engineers, Inc.*, available at http://standards.ieee.org/announcements/pr_802153wpanguide.html (2004).

IEEE Std 802.15.3c/D07 (Amendment to IEEE Std 802.15.3-2003) "Draft Amendment to IEEE Standard for Information technology—Telecommunications and information exchange between systems—Local and metropolitan area networks—Specific requirements—Part 15.3: Wireless Medium Access Control (MAC) and Physical Layer (PHY) Specifications for High Rate Wireless Personal Area Networks (WPANs): Amendment 2: Millimeter-wave based Alternative Physical Layer Extension," *The Institute of Electrical and Electronics Engineers, Inc.* (2009).

"IEEE Std. 802.11n™ IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, Oct. 2009.

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, (Jun. 12, 2007).

Office Action for corresponding European Application No. 09 791 953.4 dated Jan. 27, 2012.

Office Action for corresponding Japanese Application No. 2011-525173 dated Jul. 17, 2012.

\* cited by examiner

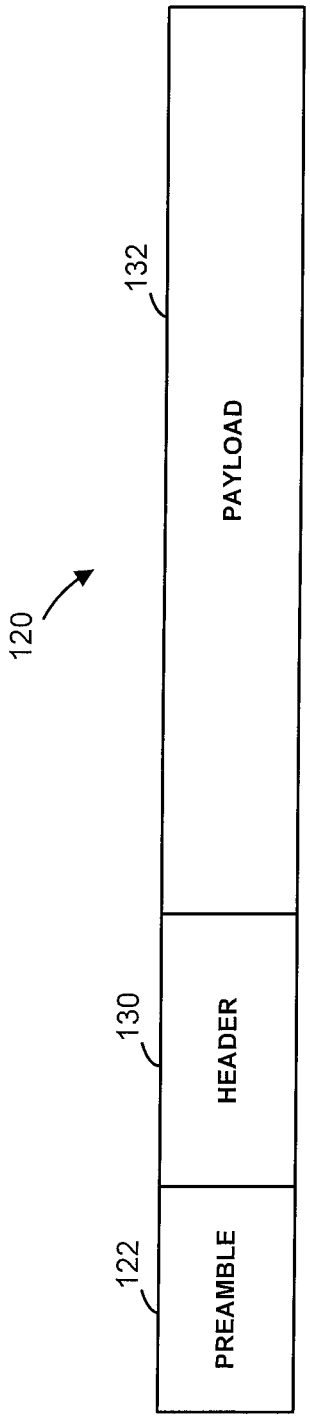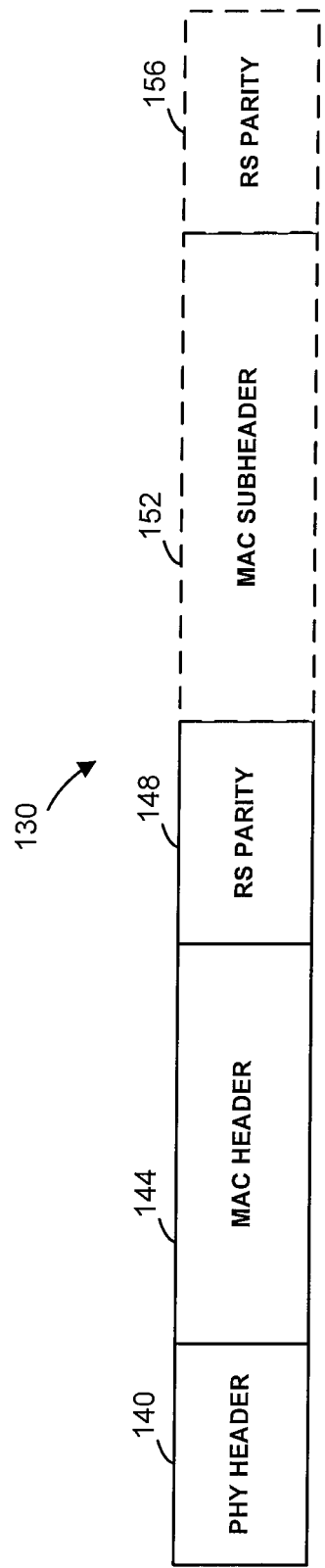
FIG. 3A (PRIOR ART)
FIG. 3B (PRIOR ART)

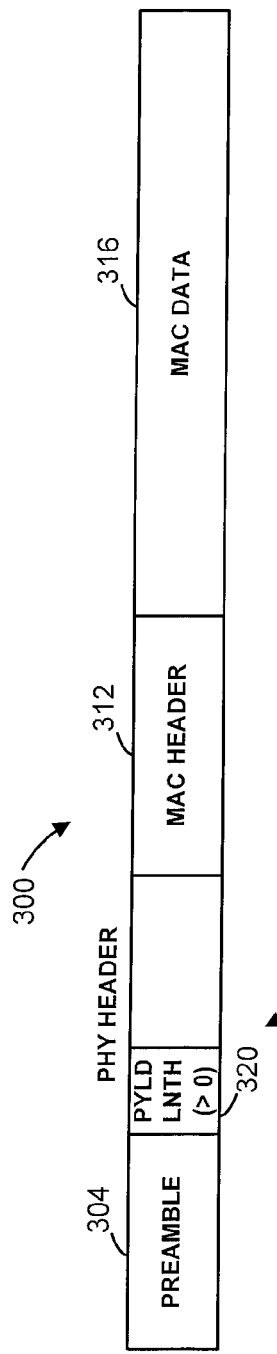
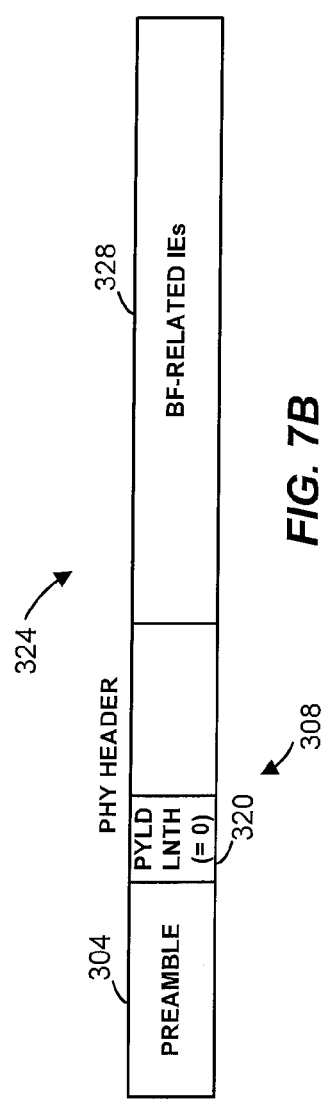
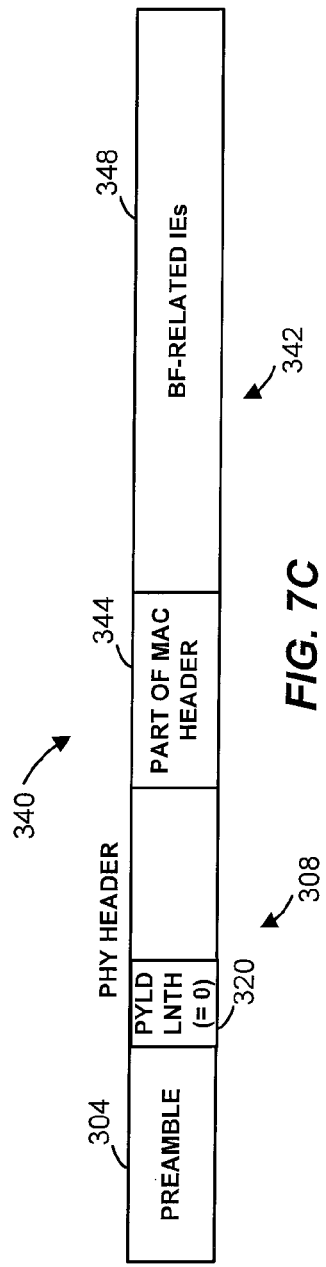
FIG. 7A
FIG. 7B
FIG. 7C

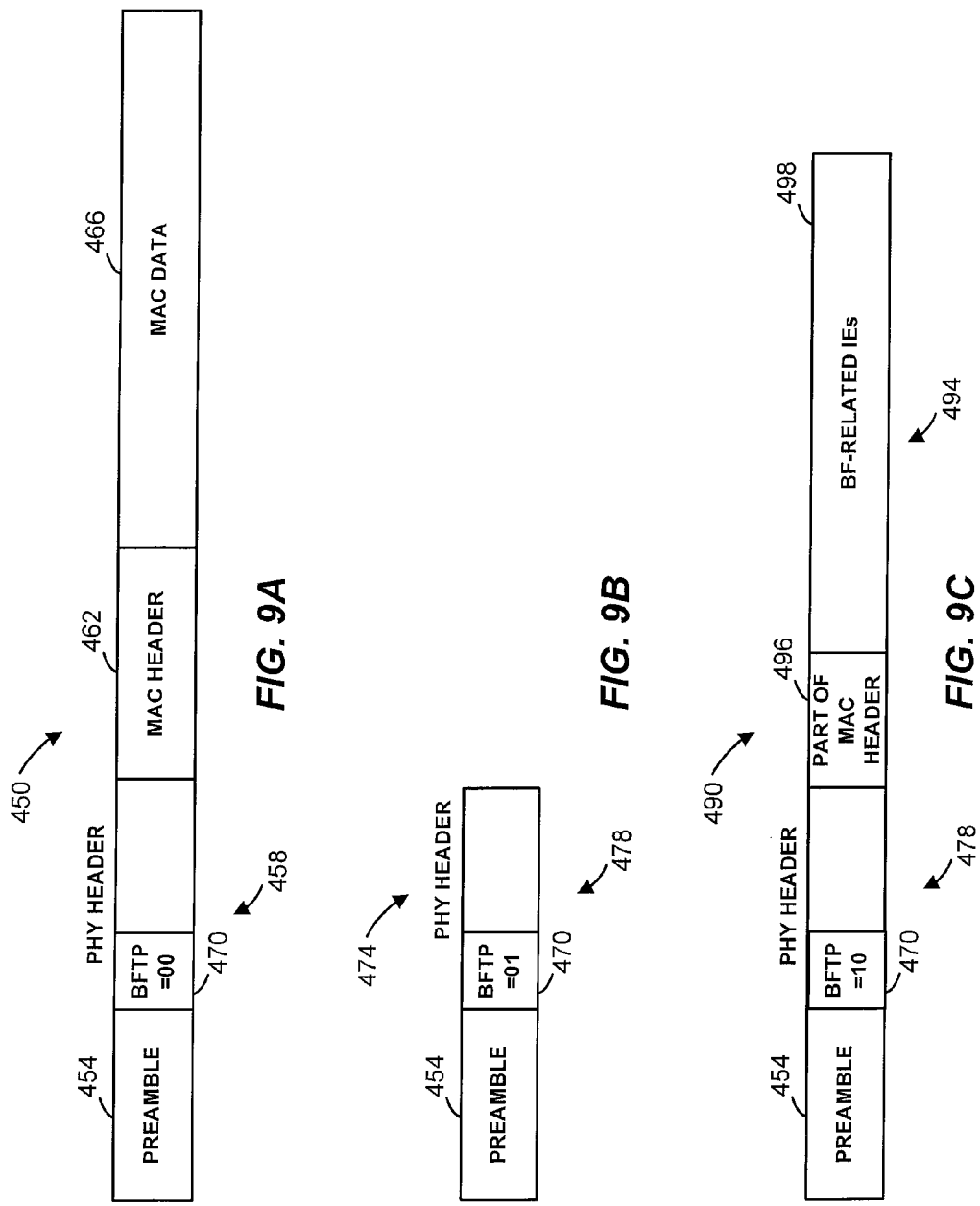

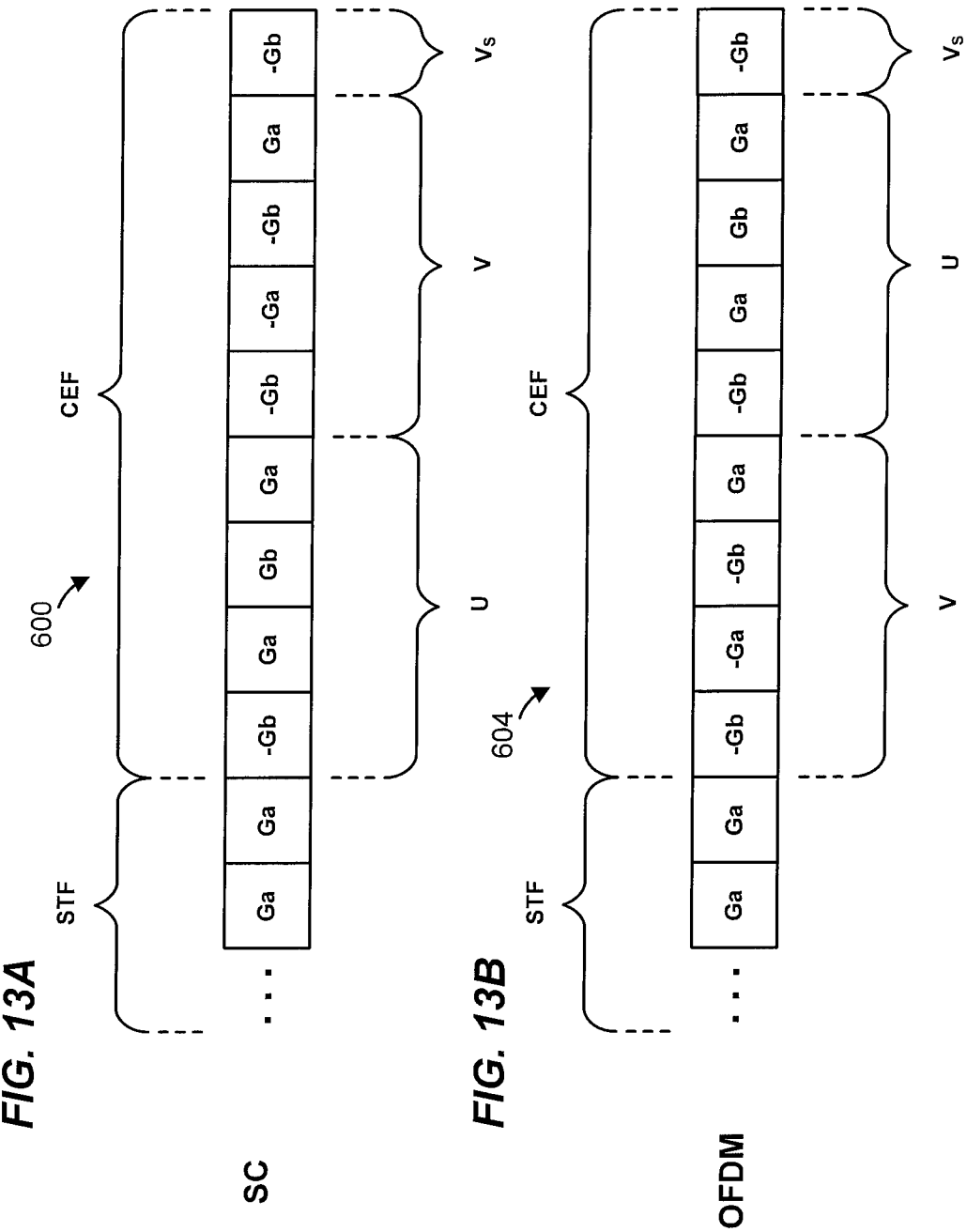

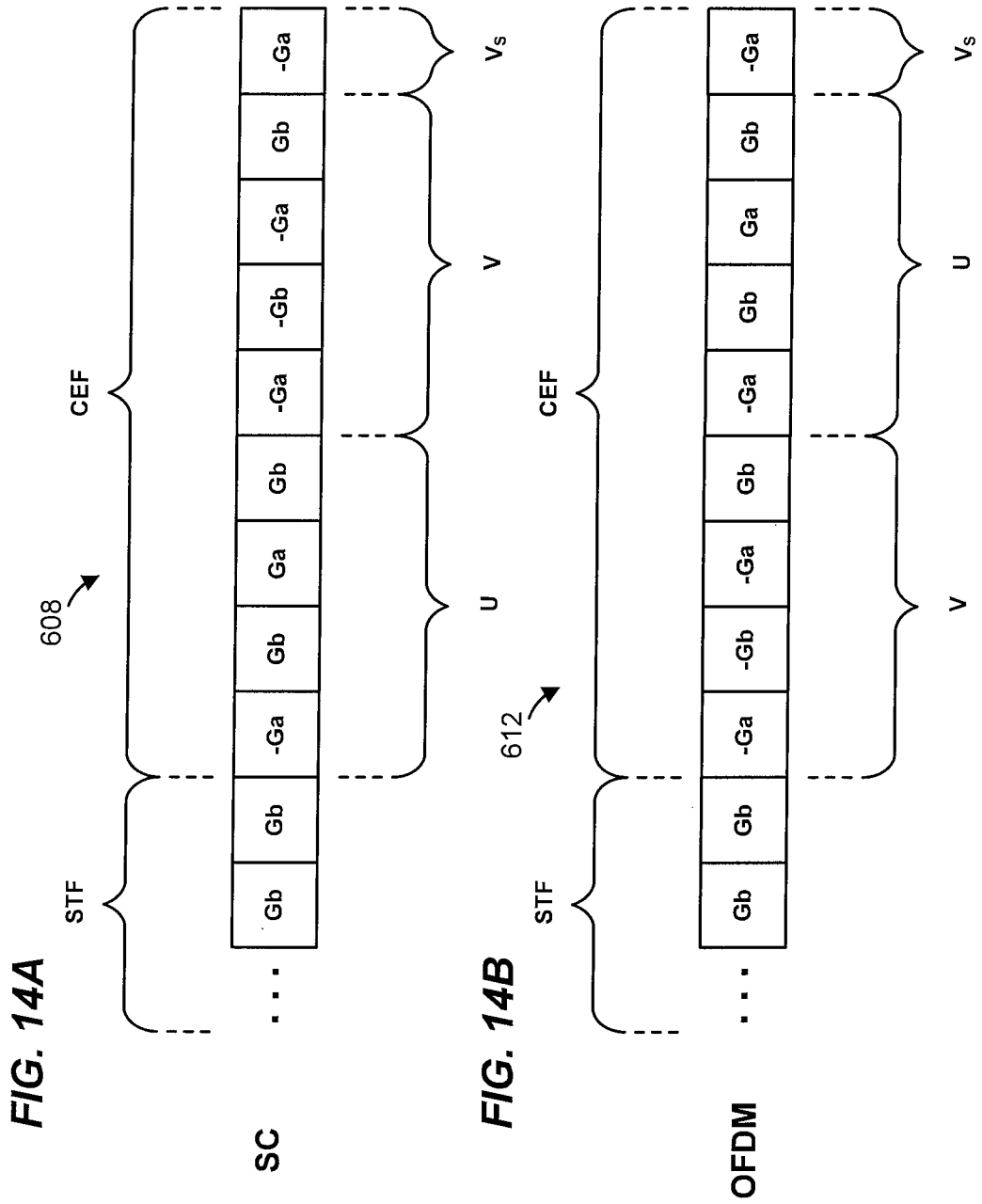

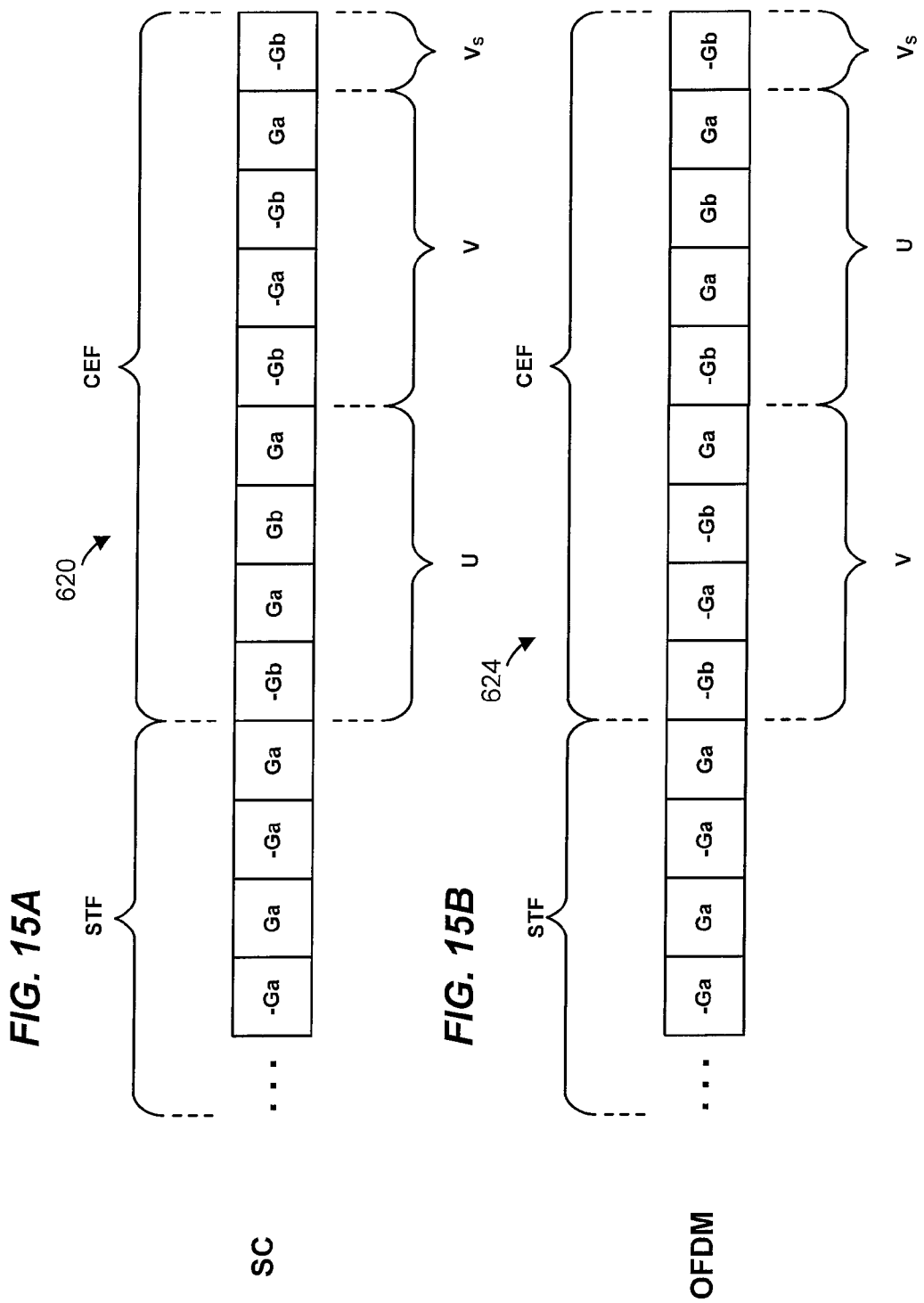
FIG. 15A SC
FIG. 15B OFDM

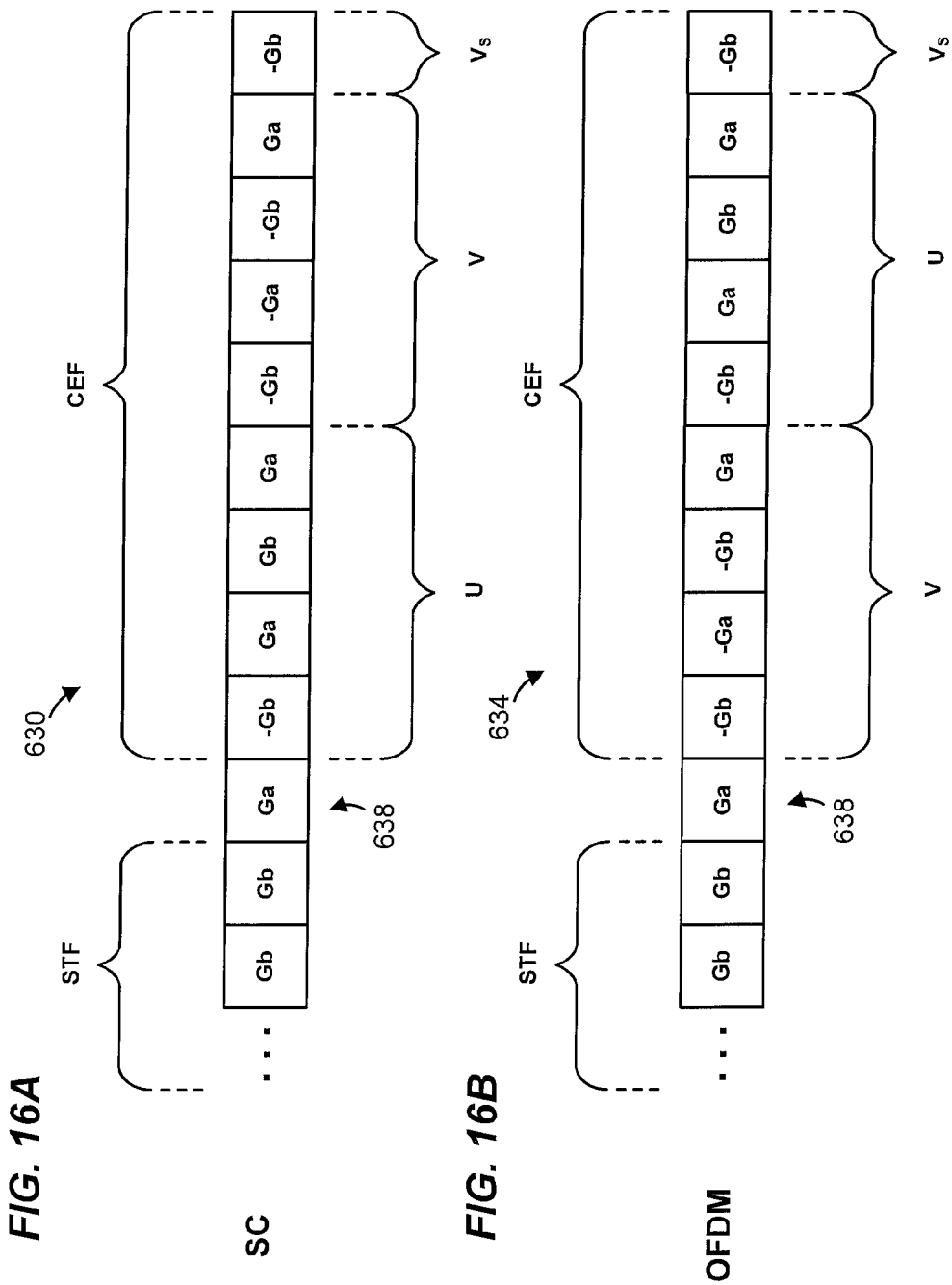

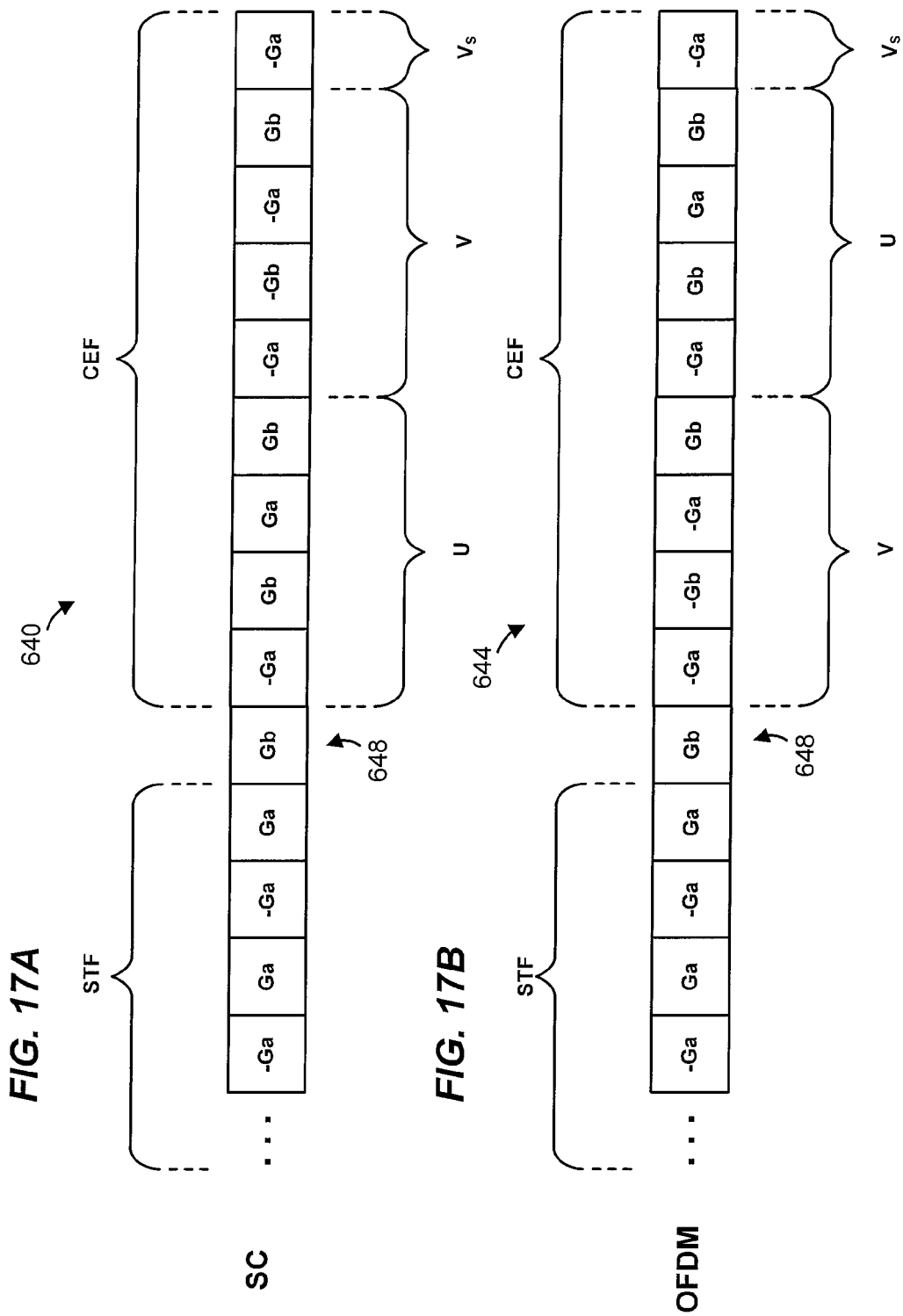

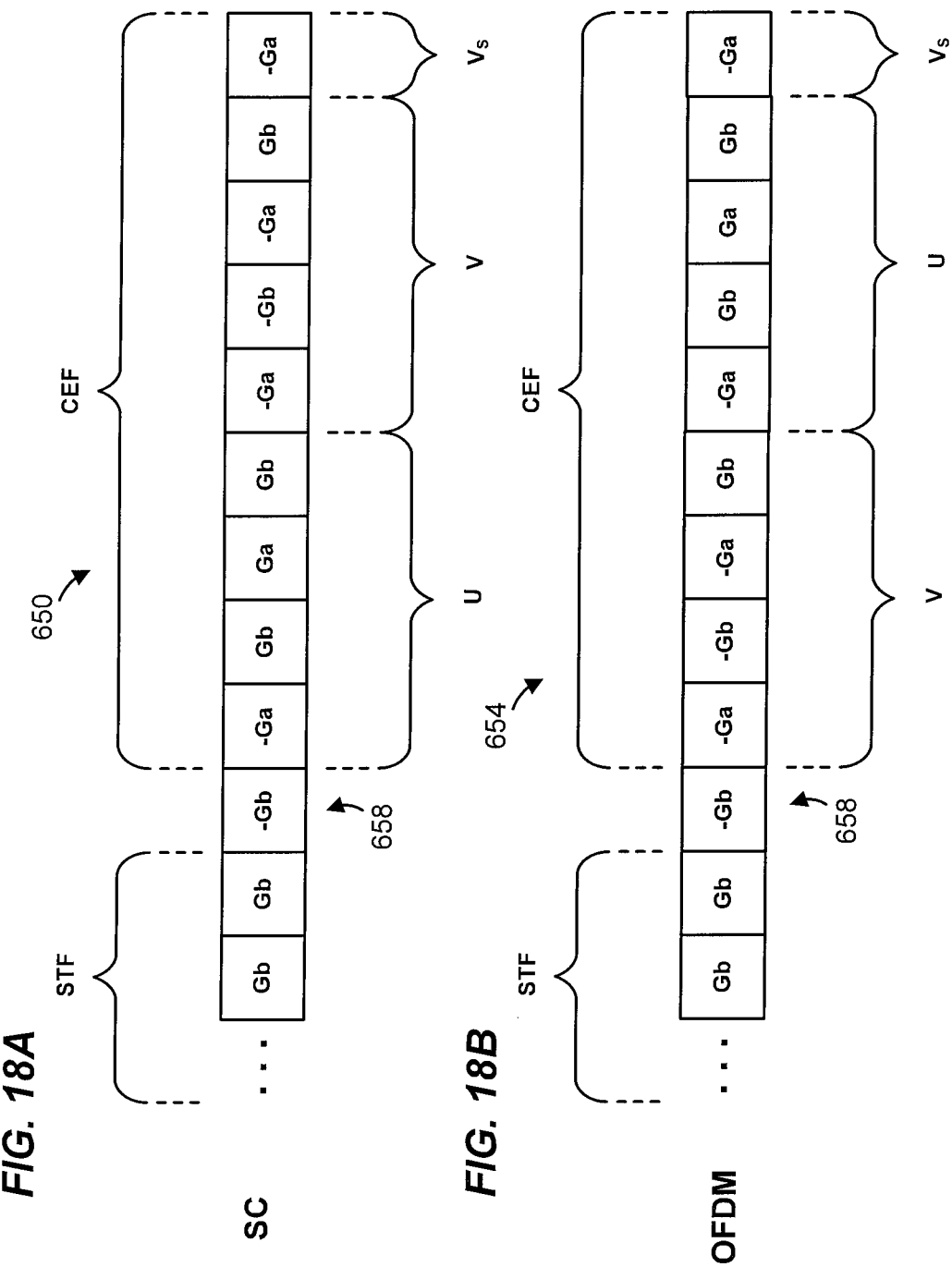

PHYSICAL LAYER DATA UNIT FORMAT

CROSS REFERENCE TO RELATED APPLICATIONS

This application claims the benefit of U.S. Provisional Patent Application No. 61/091,909, entitled "Beamforming Training Packets in TDMA Networks for Channel Training," filed Aug. 26, 2008 the disclosure of which is hereby expressly incorporated herein by reference.

FIELD OF TECHNOLOGY

The present disclosure relates generally to communication systems and, more particularly, to information formats for exchanging information via communication channels.

BACKGROUND

An ever-increasing number of relatively inexpensive, low power wireless data communication services, networks and devices have been made available over the past number of years, promising near wire speed transmission and reliability. Various wireless technology is described in detail in several IEEE standards documents, including for example, the IEEE Standard 802.11b (1999) and its updates and amendments, as well as the IEEE 802.15.3 Draft Standard (2003) and the IEEE 802.15.3c Draft D0.0 Standard, all of which are collectively incorporated herein fully by reference.

As one example, a type of a wireless network known as a wireless personal area network (WPAN) involves the interconnection of devices that are typically, but not necessarily, physically located closer together than wireless local area networks (WLANs) such as WLANs that conform to the IEEE Standard 802.11a. Recently, the interest and demand for particularly high data rates (e.g., in excess of 1 Gbps) in such networks has significantly increased. One approach to realizing high data rates in a WPAN is to use hundreds of MHz, or even several GHz, of bandwidth. For example, the unlicensed 60 GHz band provides one such possible range of operation.

In general, transmission systems compliant with the IEEE 802.15n standards support one or both of a Single Carrier (SC) mode of operation and an Orthogonal Frequency Division Multiplexing (OFDM) mode of operation to achieve higher data transmission rates. For example, a simple, low-power handheld device may operate only in the SC mode, a more complex device that supports a longer range of operation may operate only in the OFDM mode, and some dual-mode devices may switch between SC and OFDM modes. Additionally, devices operating in such systems may support a control mode of operation at the physical layer of the protocol stack, referred to herein as "control PHY." Generally speaking, control PHY of a transmission system corresponds to the lowest data rate supported by each of the devices operating in the transmission system. Devices may transmit and receive control PHY frames to communicate basic control information such as beacon data or beamforming data, for example.

The IEEE 802.15.3c Draft D0.0 Standard is directed to wireless wideband communication systems that operate in the 60 GHz band. In general, antennas and, accordingly, associated effective wireless channels are highly directional at frequencies near or above 60 GHz. When multiple antennas are available at a transmitter, a receiver, or both, it is therefore important to apply efficient beam patterns to the antennas to better exploit spatial selectivity of the corresponding wireless channel. Generally speaking, beamforming or beamsteering creates a spatial gain pattern having one or more high gain lobes or beams (as compared to the gain obtained by an omni-directional antenna) in one or more particular directions, with reduced the gain in other directions. If the gain pattern for multiple transmit antennas, for example, is configured to produce a high gain lobe in the direction of a receiver, better transmission reliability can be obtained over that obtained with an omni-directional transmission.

Beamforming generally involves controlling the phase and/or amplitude of a signal at each of a plurality of antennas to define a radiation or gain pattern. The set of amplitudes/phases applied to a plurality of antennas to perform beamforming is often referred to as a steering vector (or "phasor"). The IEEE 802.15.3c Draft D0.0 Standard proposes a method for selecting a steering vector. For selecting a transmit steering vector, the proposed method generally involves, for example, transmitting training signals during a training period using each of a plurality of steering vectors, determining the quality of the received training signals, and selecting a steering vector that corresponds to the "best" received training signal.

SUMMARY

In one embodiment, in a wireless communication system wherein communication devices exchange information utilizing data units that conform to a first format, a method is provided for transmitting a beamforming training (BFT) data unit that conforms to a second format, wherein a length of the BFT data unit is shorter than lengths supported by the first format, wherein the BFT data unit is for transmitting PHY beamforming training information. The method may include causing information to indicate the BFT data unit conforms to the second format to be transmitted to a receiving device; and generating the BFT data unit according to the second format, wherein the BFT data unit includes BFT information elements. The method also may include causing the BFT data unit to be transmitted to the receiving device.

In another embodiment, in a wireless communication system wherein communication devices exchange information utilizing data units that conform to a first format, a method is provided for processing a beamforming training (BFT) data unit that conforms to a second format, wherein a length of the BFT data unit is shorter than lengths supported by the first format, wherein the BFT data unit is for transmitting BFT information. The method may include receiving information that indicates a received data unit is a BFT data unit; and, in response to receiving the information that indicates the received data unit is a BFT data unit, processing the received data unit according to the second format to recover BFT information elements in the received data unit. Additionally, the method may include utilizing the BFT information elements in the received data unit to perform a BFT function.

In yet another embodiment, a communication device for use in a wireless communication system is provided, wherein the communication device exchanges information with other communication devices utilizing data units that conform to a first format, and utilizing a beamforming training (BFT) data unit that conforms to a second format, wherein a length of the BFT data unit is shorter than lengths supported by the first format, wherein the BFT data unit is for transmitting BFT information. The communication device may comprise a controller configured to cause information to indicate the BFT data unit conforms to the second format to be transmitted to a receiving device, generate the BFT data unit according to the second format, wherein the BFT data unit includes BFT information elements, and cause the BFT data unit to be transmitted to the receiving device.

In a wireless communication system wherein communication devices exchange information utilizing data units that conform to a first format, a method for generating a physical layer (PHY) data unit that conforms to a second format, wherein the PHY data unit is for transmitting PHY information, the method comprising: generating a first portion of the PHY data unit to indicate the PHY data unit conforms to the second format, wherein the first portion of the PHY data unit includes a preamble and at least a beginning portion of a PHY header; and generating a second portion of the PHY data unit according to the second format, wherein the second portion of the PHY data unit includes PHY information elements.

In a wireless communication system wherein communication devices exchange information utilizing data units that conform to a first format, a method for generating a physical layer (PHY) data unit that conforms to a second format, wherein the PHY data unit is for transmitting PHY information, the method comprising: analyzing a first portion of a received data unit to determine if the received data unit is a PHY data unit, wherein the first portion of the received data unit includes a preamble and at least a beginning portion of the PHY header; if the received data unit is a PHY data unit, utilizing PHY information elements in a second portion of the PHY data unit to perform a PHY function, wherein the second portion of the PHY data unit conforms to the second format.

A communication device for use in a wireless communication system, wherein the communication device exchanges information with other communication devices utilizing data units that conform to a first format, and utilizing a physical layer (PHY) data unit that conforms to a second format, wherein the PHY data unit is for transmitting PHY information, the communication device comprising: a PHY data unit generator configured to: generate a first portion of the PHY data unit to indicate the PHY data unit conforms to the second format, wherein the first portion of the PHY data unit includes a preamble and at least a beginning portion of a PHY header, and generate a second portion of the PHY data unit according to the second format, wherein the second portion of the PHY data unit includes PHY information elements.

BRIEF DESCRIPTION OF THE DRAWINGS

FIGS. 3A and 3B is a diagram of a prior art data unit format;

FIG. 7A is a diagram of an example default data unit format;

FIG. 7B is an example BFT data unit format;

FIG. 7C is another example BFT data unit format;

FIG. 9A is a diagram of an example default data unit format;

FIG. 9B is an example of a first BFT data unit sub-format;

FIG. 9C is an example of a second BFT data unit sub-format;

FIGS. 13A and 13B are diagrams of example spreading for a preamble of a default data unit format for a single carrier (SC) mode and an Orthogonal Frequency Division Multiplexing (OFDM) mode;

FIGS. 14A and 14B are diagrams of example spreading for a preamble of a BFT data unit format for SC mode and OFDM mode, wherein a complementary spreading sequence is used in the STF compared to the spreading of FIGS. 13A and 13B;

FIGS. 15A and 15B are diagrams of example spreading for a preamble of a BFT data unit format for SC mode and OFDM mode, wherein a different cover code is used in the STF compared to the spreading of FIGS. 13A and 13B;

FIGS. 16A and 16B are diagrams of another example spreading for a preamble of a BFT data unit format for SC mode and OFDM mode, wherein a complementary spreading sequence is used in the STF compared to the spreading of FIGS. 13A and 13B;

FIGS. 17A and 17B are diagrams of another example spreading for a preamble of a BFT data unit format for SC mode and OFDM mode, wherein a different cover code is used in the STF compared to the spreading of FIGS. 13A and 13B;

FIGS. 18A and 18B are diagrams of another example spreading for a preamble of a BFT data unit format for SC mode and OFDM mode, wherein a complementary spreading sequence is used in the STF compared to the spreading of FIGS. 13A and 13B;

DETAILED DESCRIPTION

Figure 1:
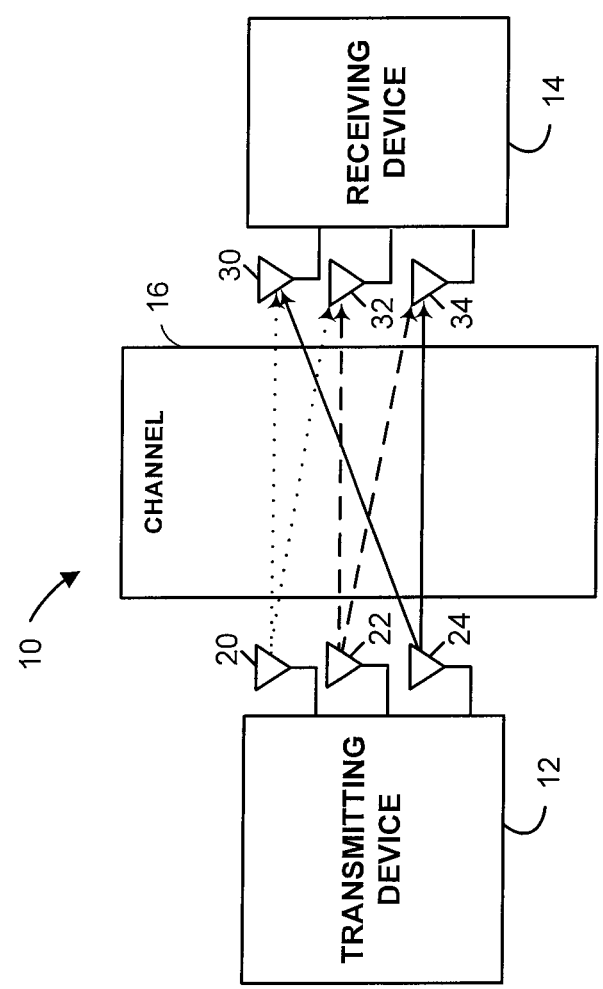
FIG. 1 is a block diagram of a communication system including a transmitter and a receiver that may communicate physical layer (PHY) information using data units that conform to a PHY data unit format.

FIG. 1 is a block diagram of an example wireless communication system 10 in which devices, such as a transmitting device 12 and a receiving device 14, may transmit and receive data units (e.g., packets) via a shared wireless communication channel 16. The devices 12 and 14 may communicate according to a communication protocol that utilizes different physical layer (PHY)/media access control (MAC) layer packet formats depending on the mode of operation. For example, when the devices 12 and 14 need to exchange information provided by a layer in a protocol stack at or above the MAC layer, a first format (i.e., a regular format) is utilized, whereas if beamforming training is being performed, a second format (i.e., a beamforming training (BFT) format) is utilized. In some embodiments, the BFT format may be considered a sub-format of a physical layer control format (i.e., a control PHY format) for performing physical layer functions or procedures and/or communication physical layer information. Control PHY may be associated with multiple sub-formats defined for separate physical layer procedures (e.g., beacon transmission, beamforming), different transmission modes (e.g., single carrier (SC) only, OFDM only, SC/OFDM), and/or other purposes related to physical layer operations. Each of the devices 12 and 14 may be, for example, a mobile station or a non-mobile station equipped with a set of one or more antennas 20-24 and 30-34, respectively. Although the wireless communication system 10 illustrated in FIG. 1 includes two devices 12, 14, each with three antennas, the wireless communication system 10 may, of course, include any number of devices, each equipped with the same or a different number of antennas (e.g., 1, 2, 3, 4 antennas and so on). For beamforming, however, at least one of the devices 12, 14 generally should include more than one antenna.

Also, it will be noted that although the wireless communication system 10 illustrated in FIG. 1 includes a transmitting device 12 and a receiving device 14, devices in the wireless communication system 10 may generally operate in multiple modes (e.g., a transmit mode and a receive mode). Accordingly, in some embodiments, antennas 20-24 and 30-34 may support both transmission and reception. Alternatively or additionally, a given device may include separate transmit antennas and separate receive antennas. It will be also understood that because each of the devices 12 and 14 may have a single antenna or multiple antennas, the wireless communication system 10 may be a multiple input, multiple output (MIMO) system, a multiple input, single output (MISO) system, a single input, multiple output (SIMO) system, or a single input, single output (SISO) system. For beamforming, however, at least one of the devices 12, 14 generally should include more than one antenna. Thus, in beamforming, the system 10 will generally be a MIMO, MISO, or SIMO system.

In general, the communication system 10 may include SC-only, OFDM-only, or dual-mode (SC and OFDM) devices. To enable any device operating in the communication system 10 to transmit and receive at least control PHY packets, modulation of control PHY is preferably selected to match the slowest data rate supported in the communication system 10 and to utilize the SC mode. In other words, because each OFDM device typically is capable of processing at least control PHY packets transmitted in the SC mode, modulating control PHY packets using the SC mode generally provides any device with access to control PHY messaging. In some embodiments, each device operating in the communication system 10 is capable of transmitting and receiving OFDM signals, and control PHY packets may be modulated using OFDM, if desired. In yet other embodiments, transmission of control PHY packets utilizes SC mode only whether or not the communication system 10 includes SC mode only devices.

As discussed above, the BFT format may, in some embodiments, correspond to only one of several sub-formats of the control PHY format. Thus, in embodiments in which the BFT format is a sub-format of the control PHY format, a receiving device may accordingly determine, in the first instance, whether a packet is a control PHY packet, followed by determining whether the packet is a beamforming training packet. In other embodiments, the BFT format need not be a sub-format of a control PHY format.

In some embodiments, data units according to the BFT format may have a shorter length as compared to data units according to the regular format. For instance, the first format may not support the data unit length of the BFT format. In these embodiments, it may be difficult for a receiver to process packets according to the BFT format because the receiver expects the BFT formats to have a longer length and thus may assume that a transmission error occurred. In some embodiments, data units according to the BFT format may have a different format as compared to data units according to the regular format. In these embodiments, it may be difficult for a receiver to process packets according to the BFT format because the receiver may expect fields in the physical layer header and/or the MAC layer header to include certain information that is not included in that location in the header of the BFT format. The present disclosure provides various techniques for signaling to the receiver that a data unit conforms to the BFT format so that the receiver can properly process the BFT data unit.

Figure 2:
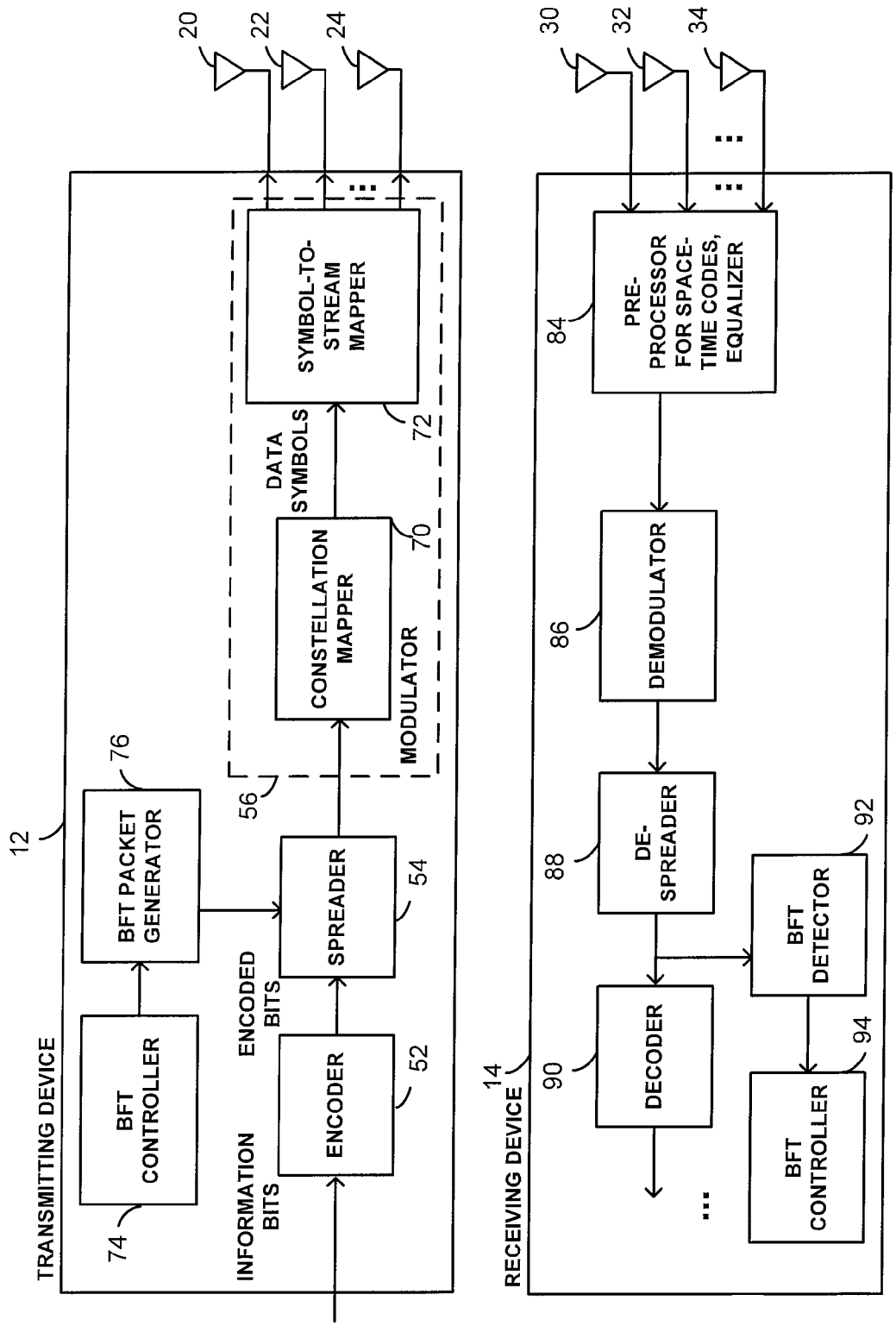
FIG. 2 depicts block diagrams of a transmitter and a receiver that may operate in the system of in FIG. 1.

FIG. 2 illustrates, in relevant part, the architectures of the transmitting device 12 and the receiving device 14. The transmitting device 12 may generally convert a sequence of information bits into signals appropriate for transmission through a wireless channel (e.g., channel 16 of FIG. 1). More specifically, the transmitting device 12 may include an encoder 52 (e.g., a convolution encoder) that encodes information bits, a spreader 54 that converts each encoded bit to a sequence of chips, and a modulator 56 that modulates the encoded chips into data symbols, which are mapped and converted to signals appropriate for transmission via one or more transmit antennas 20-24. In general, the modulator 56 may implement any desired modulation techniques based on one or more of phase shift keying, binary phase-shift keying (BPSK), $\pi/2$ BPSK (in which modulation is rotated by $\pi/2$ for each symbol or chip so that the maximum phase shift between adjacent symbols/chips is reduced from 180° to 90°), quadrature phase-shift keying (QPSK), $\pi/2$ QPSK, frequency modulation, amplitude modulation, quadrature amplitude modulation (QAM), $\pi/2$ QAM, on-off keying, minimum-shift keying, Gaussian minimum-shift keying, dual alternative mark inversion (DAMI), etc In some embodiments, the modulator 56 may include a bit-to-symbol mapper 70 that maps encoded bits into symbols, and a symbol-to-stream mapper 72 that maps the symbols into multiple parallel streams. If only one transmit antenna is utilized, the symbol-to-stream mapper 72 may be omitted. Information is transmitted in data units such as packets.

The transmitter 12 includes a beamforming training (BFT) controller 74 that generally controls operation during a BFT period in which the transmitter 12 cooperates with the receiver 14 to determine a beamforming vector or vectors for the transmitter 12 and/or the receiver 14. The transmitter 12 also includes a BFT packet generator 76 that generates packets to be transmitted during the BFT period. Packets transmitted during the BFT period may have a different format as compared to packets sent by the transmitter 12 outside of the BFT period. The BFT packet generator 76 may be coupled to the BFT controller 74 and may receive control signals from the BFT controller 74. The BFT packet generator 76 also may be coupled to the spreader 54 and/or the modulator 56, and may cause the spreader 54 and/or the modulator 56 to operate differently when transmitting BFT packets.

The transmitting device 12 may include various additional modules that, for purposes of clarity and conciseness, are not illustrated in FIG. 2. For example, the transmitting device 12 may include an interleaver that interleaves the encoded bits to mitigate burst errors. The transmitting device 12 may further include a radio frequency (RF) front end for performing frequency upconversion, various filters, power amplifiers, and so on.

The receiving device 14 may include a pre-processor for space-time codes and equalizer 84 coupled to one or more receive antennas 30-34, a demodulator 86, a despreader 88, and a decoder 90. If only one receive antenna is utilized, the pre-processor for space-time codes may be omitted, and the unit 84 may include an equalizer. The receiving device 14 also includes a BFT packet detector 92 and a BFT controller 94 that generally controls operation during a BFT period in which the receiver 14 cooperates with the transmitter 12 to determine a beamforming vector or vectors for the transmitter 12 and/or the receiver 14. The BFT packet detector 92 generally detects BFT packets and, when detected, causes the BFT packets to be forwarded to the BFT controller 94. In embodiments in which the BFT format is a sub-format of a control PHY format, the BFT packet detector 92 optionally may be a component of a control PHY packet detector (not shown). In these embodiments, the control PHY packet detector may detect control PHY packets, and the BFT packet detector 92 may detect BFT packets in the already detected control PHY packets. It will be understood that the receiving device 14 may also include other components such as filters, analog-to-digital converters, etc. that are omitted from FIG. 2 for the purposes of clarity and conciseness.

In some embodiments, as will be described in more detail below, a BFT packet may be signaled by one or more fields in a PHY header of a packet. Thus, in these embodiments, the BFT packet detector 92 may analyze the one or more fields in the PHY header to determine if the packet is a BFT packet. In other embodiments, as will be described in more detail below, a BFT packet may be signaled by modulation of a preamble and/or a header of a packet. Thus, in these embodiments, the BFT packet detector 92 may analyze the modulation of the preamble and/or the header of a packet. In these embodiments, the BFT packet detector 92 may be coupled to the demodulator 86. In still other embodiments, as will be described in more detail below, a BFT packet may be signaled by modified spreading of a preamble and/or a header of a packet. Thus, in these embodiments, the BFT packet detector 92 may analyze the spreading of the preamble and/or the header of a packet. In these embodiments, the BFT packet detector 92 may be coupled to the despreader 88.

As discussed above, the transmitting device 12 may also operate in a receive mode, and the receiving device 14 may also operate in a transmit mode. Thus, the transmitting device 12 may include at least some of the same or similar components as the receiving device 14, and vice versa.

In general, the devices 12 and 14 may communicate during the BFT period using a packet format that allows for shorter packets (referred to herein as BFT packets) as compared to a format utilized, for example, to communicate information originating from layers at or above the MAC layer. For example, much information conveyed in a PHY header and/or a MAC header may be un-needed in the BFT period. Thus, the present disclosure provides various embodiments of a BFT format that omits or reinterprets fields in the packet (e.g., in the PHY header and/or the MAC header) so that the packet length may be shortened and/or filled with more BFT information as compared to packets utilized, for example, to communicate information originating from layers at or above the MAC layer. The BFT packet generator 76 may generate the BFT packets during the BFT period, for example.

In time division multiple access (TDMA)-type networks (e.g. channel time allocation (CTA) periods in the superframe structure described in the IEEE 802.15.3c Draft D0.0 Standard), beamforming often requires transmitting training signals in frames (e.g., sounding packets) during time slots dedicated to BF training between the transmitter 12 and the receiver 14. For example, if the transmitter 12 has multiple antennas, the transmitter 12 may transmit a plurality of sounding packets to the receiver 14, where each sounding packet is sent using a different transmit beamforming vector. The receiver 14 may analyze the quality of each of the received sounding packets, and may transmit a feedback packet to the transmitter 12 indicating the "best" transmit beamforming vector. Similarly, if the receiver 14 has multiple antennas, the receiver 14 may request that the transmitter 12 transmit a plurality of sounding packets to the receiver 14. The receiver 14 may receive each sounding packet using a different receive beamforming vector. The receiver 14 may then analyze the quality of each of the received sounding packets choose a "best" receive beamforming vector.

FIG. 3A is a diagram of a prior art physical layer packet format 120. For instance, the IEEE 802.15.3c Draft D0.0 Standard utilizes the packet format 120. The packet 120 includes a preamble 122, a header 130, and a payload 132. In the IEEE 802.15.3c Draft D0.0 Standard, the preamble 122 generally provides training information that helps the receiver 14 detect the packet 120, adjust an automatic gain control (AGC) setting, obtain frequency and timing synchronization, etc. Also in the IEEE 802.15.3c Draft D0.0 Standard, the header 130 provides information of the basic PHY parameters required for decoding the payload (e.g. a length of the payload, modulation/coding method, pilot insertion information, cyclic prefix length in OFDM mode, preamble length of the next packet, reserved fields, etc.) so that the receiver 14 can adjust its decoding apparatus accordingly. The header 130 also includes MAC layer information.

FIG. 3B is a diagram illustrating a format of the header 130 specified in the IEEE 802.15.3c Draft D0.0 Standard. The header 130 includes a PHY header 140, a MAC header 144 (including a header check sequence (HCS)), and Reed-Solomon parity bits 148 generated from the MAC header 144. Optionally, the header 130 may include a MAC subheader 152 (including an HCS) and Reed-Solomon parity bits 156 generated from the MAC subheader 152.

As discussed above, the IEEE 802.15.3c Draft D0.0 Standard provides for TDMA-type communications. In a TDMA mode, each device is (or two devices are) allocated a dedicated time slot by the network controller, so that only a particular device (or a particular pair of devices) is (are) communicating during the time slot, where the other devices will be set to idle to save power. The time slot may be set so that only one device (STA1) may transmit data to the other (STA2), and STA2 may only send acknowledgment (ACK) or failure (NAK) to STA1 (often referred to as a "single direction" allocated time slot). The time slot may also be set so that both STA1 and STA2 can send data to each other (often referred to as a "bi-direction" allocated time slot).

An example of TDMA communications is seen in the super-frame structure described in the IEEE 802.15.3c Draft D0.0 Standard. A superframe 170 may include a beacon period 174, a contention access period (CAP) 178, and a channel time allocation (CTA) period 182. The beacon period 174 generally is used for transmitting control information to a piconet, allocating guaranteed time slots (GTSs), synchronization, etc. The CAP period 178 generally is used for authentication/association requests/responses, channel time requests, etc. The CTA period 182 is generally used for providing single direction allocated time slots and bi-direction allocated time slots. The CTA period 182 may include management CTA slots 186 and n CTA slots 190. Beamforming training (or maybe other purposes like antenna switching, time-domain preceding, etc) may be conducted in one or more CTA slots 190, for example. For BFT, for example, the BFT period may involve transmitting BFT sounding packets over different directions (e.g., using different beamforming vectors), and a "best" direction may be chosen. During the BFT period, channel quality cannot be guaranteed. Thus, data transmission may be delayed until after BFT is finished and a beamforming vector has been selected.

The CTA in which BFT is to take place may already be allocated to a particular pair of devices (STA1 and STA2). Both STA1 and STA2 may have pre-knowledge of the other's MAC address. Thus, providing source and destination MAC addresses in a MAC header of a BFT sounding packet during a CTA 190 may, in effect, be transmitting already known information. Additionally, other information in the header of the packet 120 (FIG. 3) may not be needed for BFT.

Figure 5:
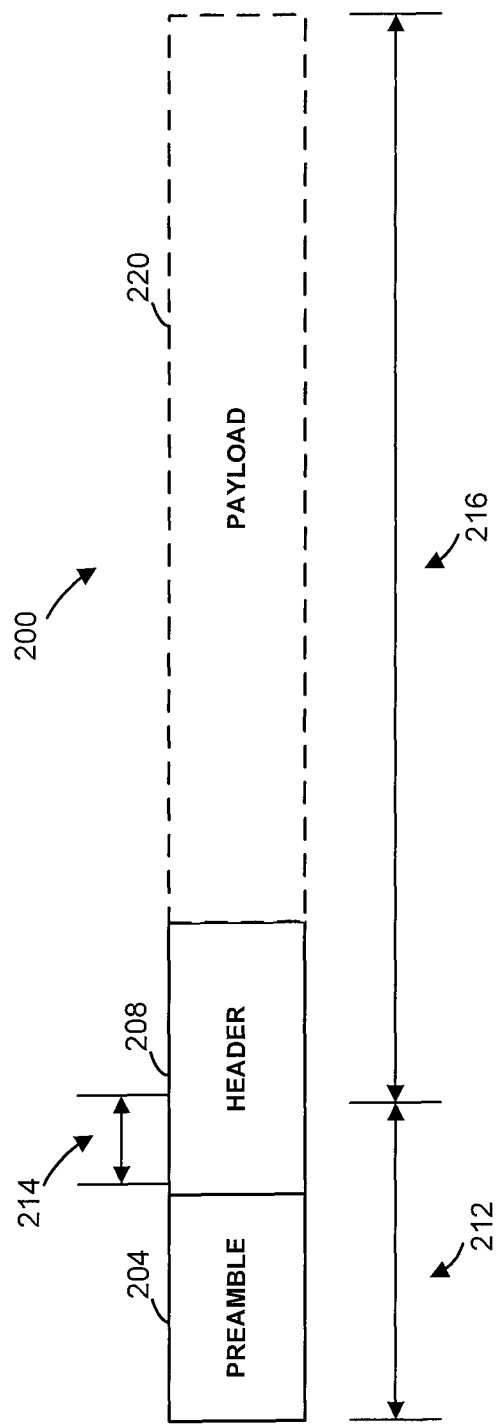
FIG. 5 is a diagram of an example beamforming training (BFT) data unit format.

FIG. 5 is a block diagram of an embodiment of a new physical layer data unit format 200 to be used in protocol functions such as beamforming training, antenna switching, time-domain preceding, etc. The format 200 will typically be used for an exchange of information for the physical layer (PHY), as opposed to exchanging data units that originated from the MAC layer or higher. For example, PHY processes in a pair of communication devices may need to exchange information for purposes of, for example, beamforming training (BFT), antenna switching, time-domain preceding, etc., and such information may be transmitted in data units that conform to the format 200. On the other hand, another format (referred to herein as the "default format"), such as the format 120 of FIG. 3A, will be utilized when communicating data units that originate from the MAC layer or higher. Typically, data units conforming to the format 200 will have a shorter length than data units conforming to the default format. For ease of explanation, the format 200 will be referred to as the "BFT packet" or the "BFT packet format". It is to be understood, however, that the format 200 may be used for other functions such as antenna switching, time-domain preceding, etc. Also, as indicated above, the BFT packet format 200 may correspond to only one of the sub-formats of a control PHY format of the communication system 10.

The BFT packet 200 includes a preamble 204 and a header 208. A first portion 212 of the BFT packet 200 includes the preamble 204 and at least a beginning portion of the header 208. The first portion 212 is encoded to indicate that the packet conforms to the BFT packet format 200 as opposed to the default format (e.g., the format 120 of FIG. 3A). The first portion 212 may be encoded in a variety of ways. For example, in some embodiments, the preamble 204 and/or the PHY header may be encoded to indicate the BFT packet format 200 by utilizing a different modulation scheme than the default format, by utilizing different spreading sequences than the default format, etc. In some embodiments, only a section 214 of the first portion 212 may be formatted differently than the respective portion of the preamble 122. Although the section 214 is illustrated in FIG. 5 as being at the beginning of the header 208, the section 214 could be located, in general, in any part of the first portion 212. In other words, not all of the first portion 212 need be formatted differently than the default format. Preferably but not necessarily, the portion 214 in these embodiments is in the earlier section of the header 208 or in the preamble 204 (as measured from the perspective of a receiving device) to allow early identification of the BFT packet format based on the portion 214. In other embodiments, a field in a PHY header portion of the header 208 may indicate the BFT packet format 200. In still other embodiments, combinations of modulation, spread codes, and PHY header fields may be used to indicate the BFT format. Various embodiments of an encoded first portion 212 are described in further detail below. If there are multiple types of control PHY packets, or sub-formats of a control PHY packet, the portion 214 may indicate whether the control PHY packet is a BFT packet. For example, a field in the PHY header may indicate whether the control PHY packet is a BFT packet.

Generally, the first portion 212 may conform to the default format. On the other hand, a second portion 216 of the BFT packet 200 generally does not conform to the default format, but rather conforms to the format 200. For example, if a receiver determines that a received packet conforms to the format 200, the receiver may reinterpret fields in the second portion 216 as compared to fields specified by the default format. For example, header fields specified by the default format could be used for BFT purposes. For example, a modulation and coding scheme (MCS) field, a cyclic prefix (CP) length field, reserved bits, etc., could be utilized for BFT information such as one or more of a BFT countdown identifier (ID) number, a feedback indication bit (e.g., if set to 1 it may indicate that a beamforming (BF) ID number field may be interpreted as an indicator of the "best" BF direction), a receive BF sweeping request subfield (e.g., the station performing receive BF may request that a transmitter send a plurality of BFT sounding packets, and the number of BFT sounding packets requested is indicated; a zero indicates receive BFT is not requested), a field indicating a forward/reverse link direction, other subfields to be used for exchanging information elements used for channel sounding for BF, etc. In embodiments in which the format 200 is not for BF, fields specified in the default format could be utilized for antenna switching training information, time-domain precoding information, MCS feedback information, etc. Thus, upon receiving a packet that conforms to the format 200, a receiver may utilize information in the packet to perform a PHY function such as selecting a beamforming vector, performing time-domain precoding, selecting an MCS, performing channel estimation, etc.

In some embodiments, the BFT packet 200 may include a payload 220, whereas in other embodiments the BFT packet 200 may omit the payload 220. In embodiments that include a payload 220, the format 200 may permit the payload 220 to be selectively omitted. For instance, the first portion 212 or the second portion 216 may be encoded to indicate whether the data unit 200 includes the payload 220. In some embodiments, the BFT packet 200 may omit the MAC header portion in the header 208 and may also omit the payload 220. In another embodiment, the BFT packet 200 may extend after the PHY header 320 and include at least a portion of a MAC header and/or a payload. For example, the BFT packet 200 may include a MAC header, or only a portion of the MAC header, such as the MAC destination address. In another embodiment, the BFT packet 200 may include a payload, but omit the MAC header. The payload may be used to transmit BFT-related IEs, for example. In one embodiment, the payload may have a fixed length.

In one embodiment, a payload length field in the PHY header (included in the header 208 and the first portion 212) may be set to zero to indicate that the packet is a BFT packet 200. If the payload length field is set to zero, other header fields specified by the default format could be used for BFT purposes (or antenna switching training information, time-domain precoding information, MCS feedback information, etc.).

Figure 6A:
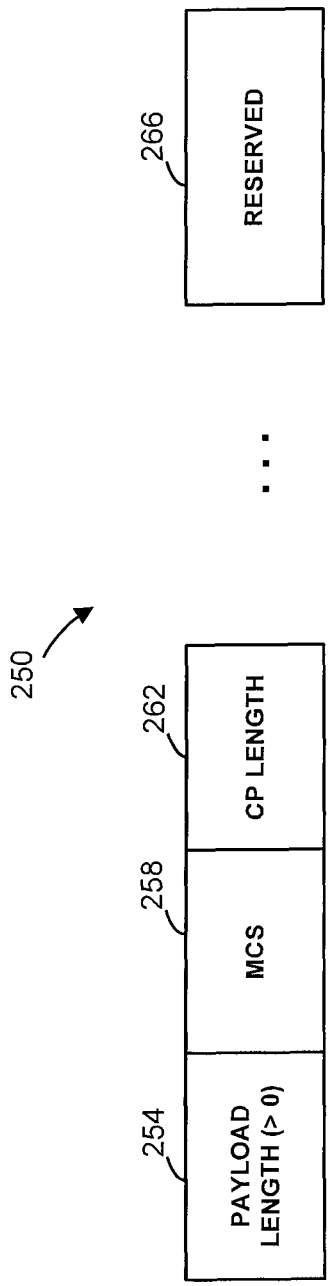
FIG. 6A is a diagram of a PHY header of an example default data unit format.
Figure 6B:
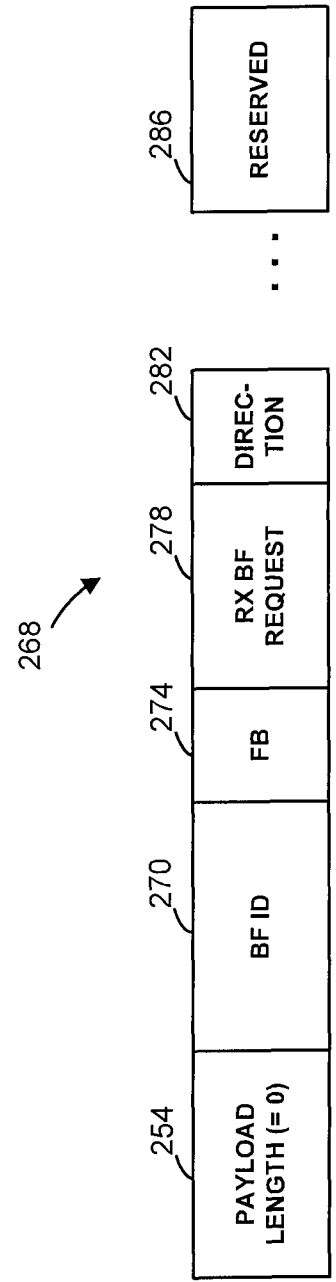
FIG. 6B is a diagram of a PHY header of an example BFT data unit format.

FIG. 6A is a block diagram of an example PHY header 250 that conforms to a default format. The PHY header 250 includes a payload length field 254, an MCS field 258, a CP length field 262, and reserved bits 266. When a value in the payload length field 254 is greater than zero, this may indicate to a receiver that the packet (and the PHY header 250) conforms to the default format. When the value in the payload length field 254 is equal to zero, this may indicate to the receiver that the packet (and the PHY header 258) conforms to the BFT format. Referring to FIG. 6B, the PHY header 268 (which conforms to the BFT packet format) includes the payload length field 254, a BF ID field 270 to indicate a BFT countdown ID number, a BFT feedback (FB) field 274 to indicate whether the BF ID field 270 should be interpreted as providing feedback of a "best" BF direction, a receive BF sweeping request subfield 278, a direction field 282 to indicate a forward/reverse link direction, and reserved bits 286.

Thus, the PHY header 268 provides BFT-related information elements (IEs). In one embodiment, the PHY header 268 may be the same length as the PHY header 254. In another embodiment, the PHY header 268 may have a different length than the PHY header 254. Referring again to FIG. 5, in one embodiment, the BFT packet 200 may end after the PHY header 268. In other words, in this embodiment, the BFT packet 200 may omit the MAC header portion in the header 208 and may also omit the payload 220.

Figure 6C:
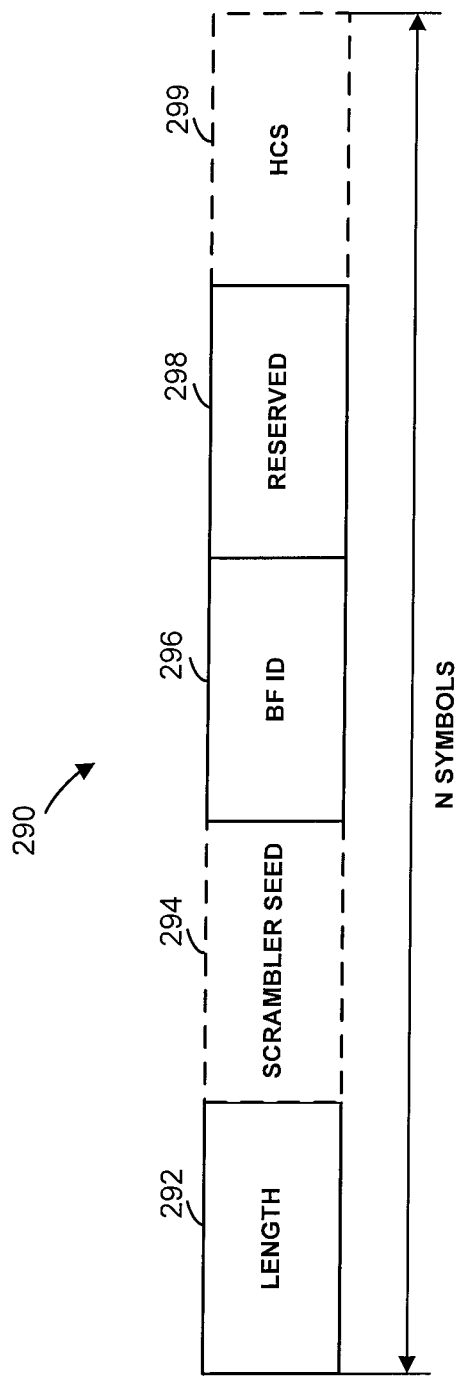
FIG. 6C is a diagram of a PHY header of another example BFT data unit format.

FIG. 6C illustrates another example BFT header 290. The BFT header 290 includes at least some of a payload length field 292, a scrambler seed field 294, a BF IF field 296, reserved bits 298, and a HCS field 299. The scrambler seed field 294 and the HCS field 299 are optional. In embodiments in which the BFT packet is to be transmitted using OFDM, the length of the control PHY header 290, N, may be selected so that the number of chips in the encoded, modulated, and spread BFT header 290 is equal to a multiple of the size of a Fast Fourier Transform (FFT) processing block (e.g., 512).

In another embodiment, the BFT packet 200 may extend after the PHY header 268 and include at least a portion of a MAC header and/or a payload. For example, the BFT packet 200 may include a MAC header, or only a portion of the MAC header, such as the MAC destination address. In another embodiment, the BFT packet 200 may include a payload, but omit the MAC header. The payload may be used to transmit BFT-related IEs, for example. In one embodiment, the payload may have a fixed length.

FIG. 7A illustrates an example default format 300 that includes a preamble 304, a header (including a PHY header 308 and a MAC header 312), and a payload 316, that may include MAC data. The MAC header 312 and the payload 316 may form a physical layer service data unit (PSDU). The PHY header 308 includes a payload length field 320, which may indicate the length of the PSDU. When the value in the payload length field 320 is greater than zero, this may indicate to a receiver that a received packet conforms to the default format 300.

FIG. 7B illustrates one embodiment of a BFT packet format 324. The preamble 304 and the PHY header 308 may be the same as the default format 300, but the payload length field 320 is set to zero. The BFT packet format 324 omits the MAC header 312 and includes a fixed length payload 328 that may be utilized to transmit BF-related IEs, for example. Thus, when the value in the payload length field 320 is set to zero, this may indicate to a receiver that a received packet conforms to the BFT format 324.

FIG. 7C illustrates another embodiment of a BFT packet format 340. The preamble 304 and the PHY header 308 may be the same as the default format 300, but the payload length field 320 is set to zero. The BFT packet format 324 includes a fixed length PSDU 342 that includes only a portion 344 of the MAC header 312 (FIG. 7A) and includes a payload 348 that may be utilized to transmit BF-related IEs, for example. The MAC header portion 344 may include only one of a MAC source address and a MAC destination address, for example. For instance, a MAC destination address may be included but the MAC source address may be omitted. When the value in the payload length field 320 is set to zero, this may indicate to a receiver that a received packet conforms to the BFT format 340. In a context in which the BFT packet 340 is to be transmitted in a preallocated time slot for a designated transmitter/receiver pair, one or both of the MAC source address and the MAC destination address may be assumed by the designated transmitter/receiver pair. But it may be useful for other devices to know the MAC address of the source or destination so that they can know to ignore the BFT packet.

Figure 8A:
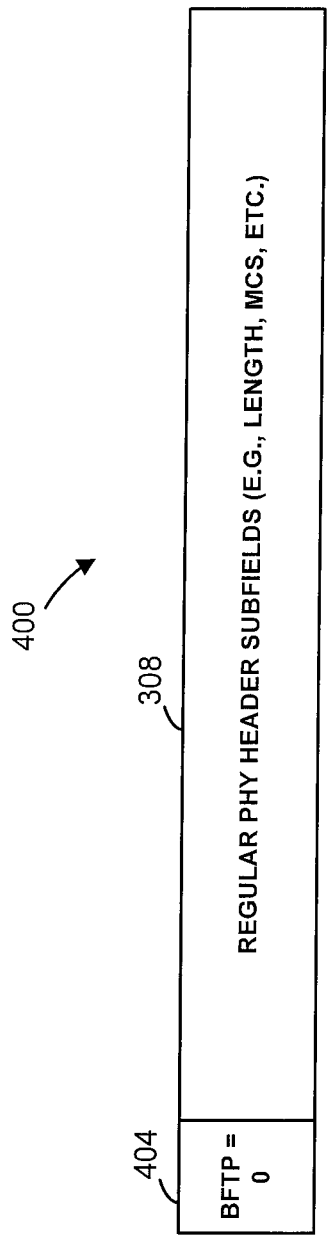
FIG. 8A is a diagram of a PHY header of an example default data unit format.

In an alternative to any of the embodiments described with reference to FIGS. 5, 6A, 6B, 7A, 7B, and 7C, a BFT packet may be indicated by one or more additional bits in the PHY header, rather than using a payload length field. For example, the PHY header may include a BFT packet (BFTP) bit that indicates whether the packet conforms to a default format or to a BFT format. FIG. 8A is a block diagram of another example PHY header 400 that conforms to a default format. The PHY header 400 includes a BFTP field 404 that may be used to indicate whether the packet is a BFT packet. In one embodiment, the BFTP field 404 may be a single bit. For example, if the BFT packet bit 404 is set to zero, this may indicate that the packet conforms to the default format. The PHY header 400 also includes regular or default PHY header subfields 408. A packet that utilizes the PHY header 400 will also include a MAC header and a payload.

Figure 8B:
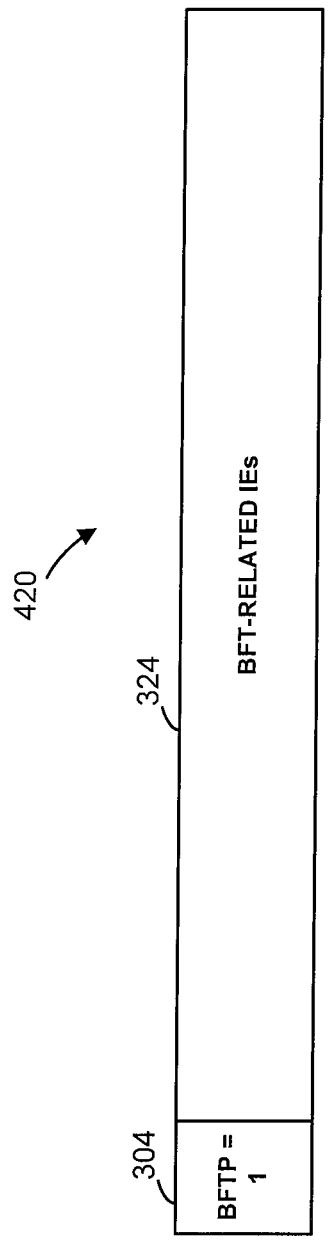
FIG. 8B is a diagram of a PHY header of an example BFT data unit format.

FIG. 8B is a block diagram of an example PHY header 420 that conforms to a BFT format. The PHY header 420 includes the BFT packet field 404. For example, if the BFTP field 404 is a single bit set to one, this may indicate that the packet conforms to the BFT format 420. The PHY header 420 also includes BFT-related IEs 424 such as described with reference to FIG. 6B. In one embodiment, a BFT packet having a PHY header 420 may include a fixed length payload (e.g., that includes a portion of a MAC header and/or BFT IE's). In another embodiment, a BFT packet having a PHY header 420 may omit the payload.

FIG. 9A illustrates an example default format 450 that includes a preamble 454, a header (including a PHY header 458 and a MAC header 462), and a payload 466, that may include MAC data. The MAC header 462 and the payload 466 may form a PSDU. The PHY header 458 includes a BFTP field 470, which indicates whether a packet conforms to the default format 450 or to a BFT format. When the value in the BFTP field 470 is zero (or some other specified number), this may indicate to a receiver that a received packet conforms to the default format 450.

FIG. 9B illustrates one embodiment of a BFT packet format 474. The preamble 454 may be the same as the default format 450, but a PHY header 478 may have a different format than the PHY header 458. The PHY header 478 may be utilized to transmit BF-related IEs, for example. Also, the BFT packet format 474 may omit a PSDU. The BFTP field 470 may be set to one (or some other specified number) to indicate to a receiver that a received packet conforms to the BFT packet format 474. The BFT packet format 474 may used in a context in which the BFT packet 474 is to be transmitted in a preallocated time slot for a designated transmitter/receiver pair, for example, and in which one or both of the MAC source address and the MAC destination address may be assumed by the designated transmitter/receiver pair.

FIG. 9C illustrates one embodiment of a BFT packet format 490. The preamble 454 may be the same as the default format 450, but the PHY header 478 may have a different format than the PHY header 458. The BFTP field 470 may be set to two (or some other specified number) to indicate to a receiver that a received packet conforms to the BFT packet format 490 (as opposed to the format 450 or the format 474. The BFT packet format 324 includes a fixed length PSDU 494, which may include only a portion 496 of the MAC header 462 (FIG. 9A) and/or a payload 498 that may be utilized to transmit BF-related IEs, for example. The MAC header portion 496, if included, may include only one of a MAC source address and a MAC destination address, for example. For instance, a MAC destination address may be included but the MAC source address may be omitted. The BFT packet format 490 may be utilized in a context in which it would be useful to know one or both of the MAC source address and the MAC destination address, such as during an association beamforming state.

In another embodiment similar to the embodiment illustrated in FIGS. 9A, 9B, and 9C, the payload length field of the PHY header can be utilized along with a one-bit BFTP field. For example, if the payload length field is set to zero, this may indicate the format 450. If the payload length field is set to one, the BFTP bit may be used to indicate the format 474 or the format 490.

In the embodiments discussed with respect to FIGS. 5, 6B, 7B, 8B and 9B, MAC header information is not included in the BFT packet. This may lead to the BFT packet interfering with adjacent networks as an unknown frame. Thus, in some embodiments, a network controller, for example, may assign an identifier (ID) for use with BFT frames in the same network and may announce the ID to devices in the network. The ID may be randomly or pseudo-randomly generated, for example, so that the ID is likely to be different than ID's for adjacent networks. The ID may be included in the PHY header (or the payload, if included) to help differentiate between BFT frames of different networks. Such an ID may also be included in BFT packets that do include MAC information, such as in embodiments discussed with reference to FIGS. 7C and 9C.

In the embodiments discussed with respect to FIGS. 6A, 6B, 7A, 7B, 7C, 8A, 8B, 9A, 9B and 9C, the PHY header in the BFT format may be the same length as the PHY header in the default format. For example, the PHY header may be encoded and thus the payload length field and/or the BFTP field cannot be determined until the entire PHY header is received and decoded. In other embodiments, the PHY header in the BFT format may be a different length (e.g., longer) than the PHY header in the default format. For example, if the length field and/or the BFTP field in the PHY header indicates a BFT packet, this may also indicate a PHY header having a different length than in the default format.

Referring again to FIG. 2, the BFT packet detector 92 may analyze the one or more fields in the PHY header to determine if a packet is a BFT packet in embodiments such as described with reference to FIGS. 6A, 6B, 7A, 7B, 7C, 8A, 8B, 9A, 9B and 9C. For example, the BFT packet detector 92 may analyze the payload length field and/or the BFTP field.

In embodiments in which the BFT format specifies a fixed length payload portion and in which the BFT packet is a type of a control PHY packet, the format of the payload portion for the BFT format may be the same as the format of the payload portion for the control PHY format. In these embodiments, the preamble, header and payload of the BFT packet may be the same as the control PHY format. In these embodiments, the transmitter may signal to the receiver that a packet is a BFT packet by, for example, previously sending another packet that indicates the next packet, a packet transmitted at a certain time, etc., is a BFT packet. The previously sent packet may indicate the subsequent BFT packet using MAC layer data, for example. In other words, the transmitter may utilize the MAC layer to transmit a packet to the receiver to announce to the receiver that a subsequent packet will be a BFT packet.

Similarly, in other embodiments in which the format and/or length of the BFT is different than regular packet and/or a control PHY packet, the transmitter may signal to the receiver that a packet is a BFT packet by, for example, previously sending another packet that indicates the next packet, a packet transmitted at a certain time, etc., is a BFT packet. The previously sent packet may indicate the subsequent BFT packet using MAC layer data, for example. In other words, the transmitter may utilize the MAC layer to transmit a packet to the receiver to announce to the receiver that a subsequent packet will be a BFT packet.

In some embodiments, the preamble may be used to signal a default packet format versus a BFT packet format. In such embodiments, use of a separate BFTP field and/or use of the payload length field to signal a default packet format versus a BFT packet format may be omitted. Also in such embodiments, the PHY header in the BFT packet format may optionally be a different length than in the default format.

Figure 10A:
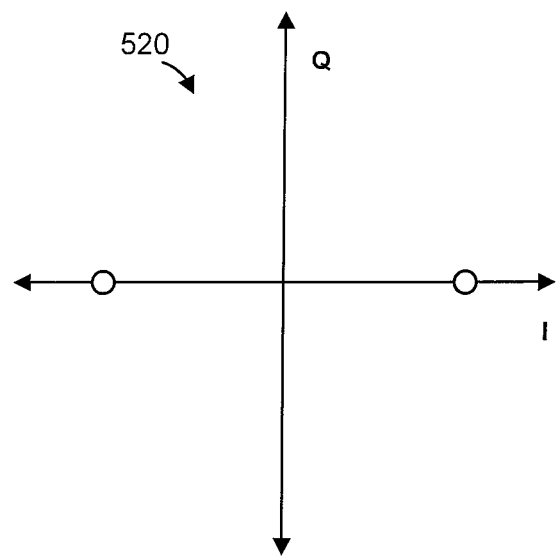
FIG. 10A is a diagram of an example modulation scheme for a preamble and/or header of a default data unit format.
Figure 10B:
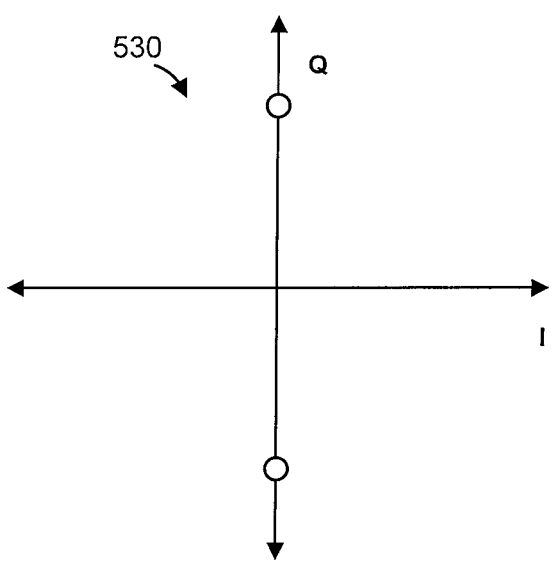
FIG. 10B is a diagram of an example modulation scheme for a preamble and/or header of a BFT data unit format, where modulation is rotated as compared to the modulation of FIG. 10A.

In one embodiment, the preamble and/or the PHY header of a BFT packet may utilize constellation points that are rotated in phase as compared to the preamble/PHY header of a default packet. The phase rotation may indicate that a packet is a BFT packet. For example, FIG. 10A is a constellation diagram 520 for modulation of a header of a default packet. In the example of FIG. 10A, the PHY header of the default packet is modulated onto +1 and −1 symbols. FIG. 10B is a constellation diagram 530 for modulation of a PHY header of a BFT packet. In the example of FIG. 10B, the PHY header of the default packet is modulated onto +j and −j symbols, and thus the modulation in FIG. 10B is rotated by $\pi/2$ as compared to the modulation in FIG. 10A. If spreading is utilized, the PHY headers corresponding to FIGS. 10A and 10B may utilize the same spreading. When using a modulation technique such as in FIGS. 10A and 10B, a receiver may detect whether a packet is a default packet or a BFT packet by detecting whether real or imaginary symbols were transmitted, for example. If spreading is utilized, a receiver may observe a plurality of blocks of the spreading sequences in the PHY header, and may compare the combined energy of the signals after despreading in order to detect whether a packet is a default packet or a BFT packet. In general, a receiver may detect whether a packet is a default packet or a BFT packet by detecting a phase rotation in the modulation of the preamble and/or the PHY header.

If $\pi/2$ BPSK (in which modulation is rotated by $\pi/2$ for each symbol or chip so that the maximum phase shift between adjacent symbols/chips is reduced from 180° to 90°) modulation is utilized, BFT packets may be modulated such that symbols of the preamble/PHY header of a BFT packet are rotated in phase by $\pi/2$ as compared to the symbols of a preamble/PHY header of a default packet.

Referring again to FIG. 2, the BFT packet detector 92 may analyze the modulation of the preamble and/or the PHY header to determine if a packet is a BFT packet in embodiments such as described with reference to FIGS. 10A and 10B. In these embodiments, the BFT packet detector 92 may receive the modulated signal and may include a phase rotation detector.

Figure 11:
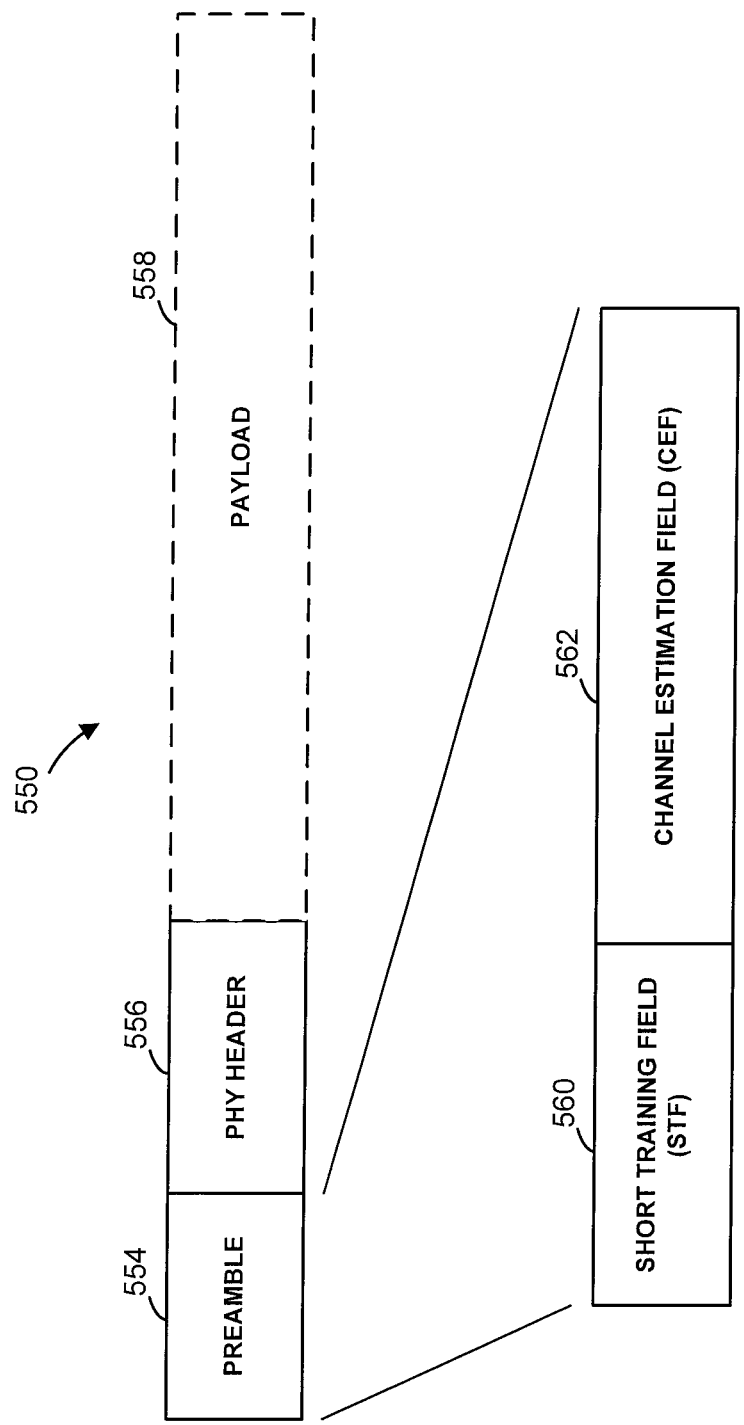
FIG. 11 is a diagram of an example BFT data unit format.

In other embodiments, a BFT packet may be signaled by modified spreading of a preamble and/or a header of a packet. An example packet format common to both default packets and BFT packets will now be described with reference to FIG. 11. A packet 550 may include a preamble 554, a header 556, and optionally a payload 558 (e.g., the payload 558 may be omitted in BFT packets). The preamble 554 generally provides training information that helps a receiver to detect a current packet, adjust an AGC (Automatic Gain Control) setting, synchronize frequency and timing, etc. The header 556 generally includes information for basic (e.g., PHY) parameters for decoding the payload 558 (e.g. length of the payload, modulation/coding method, etc.) so that the receiver can adjust its decoding apparatus accordingly. The preamble 554 may include a short training field (STF) 560 and a channel estimation field (CEF) 562. The STF 560 generally includes information that is useful for synchronization, whereas the CEF 562 generally includes information that is useful for channel estimation.

In some embodiments, the preamble 554 may have the same generally format in both default packets and BFT packets, as will be described in more detail below, except that spreading may be modified. In these embodiments, the format of the header 556 may differ between default packets and BFT packets. For example, the header of a BFT packet may be longer than in a default packet. Similarly, the payload 558 optionally may be omitted in BFT packets.

In other embodiments, the preamble 554 may have a different format in default packets as compared to BFT packets, as will be described in more detail below. For example, in some embodiments, the STF 560 may be longer in BFT packets as compared to default packets. As another example, the CEF 562 may be longer as compared to default packets. As yet another example, the STF 560 may be longer and the CEF 562 may be shorter in BFT packets as compared to default packets. As still another example, the STF 560 may be longer and the CEF 562 may be omitted in BFT packets as compared to default packets.

Figure 12C:
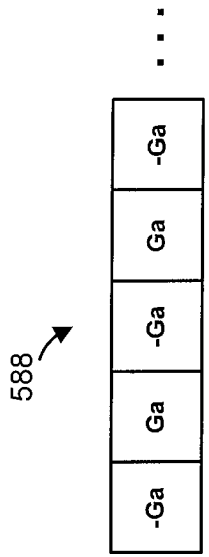
FIG. 12C is a diagram of example spreading for a preamble of a BFT data unit format, wherein a different cover code is used compared to the spreading of FIG. 12A.
Figure 12A:
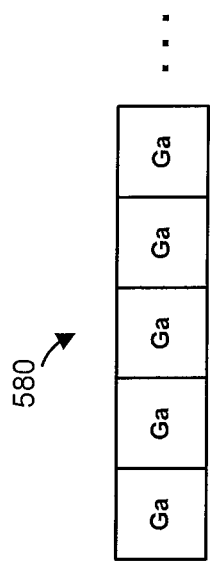
FIG. 12A is a diagram of spreading for a preamble of a default data unit format.
Figure 12B:
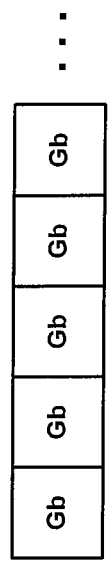
FIG. 12B is a diagram of example spreading for a preamble of a BFT data unit format, wherein a complementary spreading sequence is used compared to the spreading of FIG. 12A.

FIG. 12A is a diagram of an example STF 580 in a default packet. The STF 580 includes a plurality of sequences a which may be Golay sequences (Ga). For example, the sequence a may be a length-128 sequence (or some other suitable length). FIG. 12B is a diagram of an example STF 584 in a BFT packet that corresponds to the STF 580 of the default packet. The STF 584 includes a plurality of sequences b which may be Golay sequences (Gb). The sequence b is a complementary sequence to the Golay sequence a. Generally, the two complementary sequences a and b have correlation properties suitable for detection at a receiving device. For example, the complementary spreading sequences a and b may be selected so that the sum of corresponding out-of-phase aperiodic autocorrelation coefficients of the sequences a and b is zero. In some embodiments, the complementary sequences a and b have a zero or almost-zero periodic cross-correlation. In another aspect, the sequences a and b may have aperiodic cross-correlation with a narrow main lobe and low-level side lobes, or aperiodic auto-correlation with a narrow main lobe and low-level side lobes.

In some embodiments, the number of sequences b in the STF 584 is greater than the number of sequences a in the STF 580. This may help with synchronization in situations in which the signal to noise ratio (SNR) is lower in BFT operation as compared to default operation.

FIG. 12C is a diagram of another example STF 588 in a BFT packet that corresponds to the STF 580 of the default packet. The STF 588 includes a plurality of sequences a as in the STF 580. In the STF 588, however, the sign of alternate sequences a are flipped. In FIG. 11C, a minus sign may indicate that modulation is 180 degrees out of phase as compared to a non-negative sequence. In some embodiments, the number of sequences a in the STF 588 is greater than the number of sequences a in the STF 580. This may help with synchronization in situations in which the signal to noise ratio (SNR) is lower in BFT operation as compared to default operation.

In some embodiments, the CEF following the STF 584 and/or the STF 588 may be the same length as the CEF following the STF 580. In other embodiments, the CEF following the STF 584 and/or the STF 588 may be longer than the CEF following the STF 580. For example, if the length of the sequence a is L (e.g., L-=128 or some other suitable length), than the length of the CEF following the STF 584 and/or the STF 588 may be K*L longer than the CEF following the STF 580, where K is an integer greater than or equal to one. In these embodiments, the additional length in the CEF may be used for more reliable frame timing, and/or to keep channel estimation sequences the same as in default packets.

In still other embodiments, the CEF following the STF 584 and/or the STF 588 may be shorter than the CEF following the STF 580. For example, the CEF following the STF 584 and/or the STF 588 may be one half the length of the CEF following the STF 580, or some other suitable shorter length. In still other embodiments, the CEF may be omitted following the STF 584 and/or the STF 588.

FIGS. 13A and 13B are diagrams of a preamble format for a default packet in both a single carrier (SC) mode and an OFDM mode. In particular, FIG. 13A is a diagram of the preamble format 600 for SC mode, and FIG. 13B is a diagram of the preamble format 604 for OFDM mode. In FIG. 13A, an STF comprises a plurality of sequences a which may be Golay sequences (Ga). For example, the sequence a may be a length-128 sequence (or some other suitable length). A CEF of the preamble 600 comprises a pattern of the sequence a, and a complementary sequence b, which may also be a Golay sequence (Gb) of the same length as the sequence a, where a and b may be modified by a cover code. As used herein, the term "cover code" refers to how a series of sequences are augmented to form a longer sequence. For example, for a sequence [−b, +a, +b, +a], where a and b are complementary sequences, the cover code may be represented as [−1, +1, +1, +1], where −1 may indicate that the binary complement of the code a or b is utilized, or that the modulated signal corresponding to code −a, for example, is phase shifted by 180° with respect to the modulated signal corresponding to code +a. In this example [−b, +a, +b, +a], the cover code could be represented differently, such as [0, 1, 1, 1], where the first 0 indicates that −b is utilized. A plurality of a and b sequences in the CEF may form composite sequences u and v, where u and v are themselves complementary sequences. In some embodiments, u and v are themselves complementary Golay sequences. If the sequences a and b are each of length 128, then the sequences u and v are each of length 512. A sequence $v_s$ is merely the sequence −b, and the sequence $v_s$ acts as a cyclic postfix.

As can be seen in FIGS. 13A and 13B, the STF in both the SC mode and the OFDM mode is the same (i.e., a plurality of a sequences). Also, the CEF in both the SC mode and the OFDM mode is similar, except that the order of the sequences u and v is reversed. Also, it can be seen that $v_s$ acts as a cyclic postfix for both u and v.

FIGS. 14A and 14B are diagrams of a preamble format for a BFT packet in both a single carrier (SC) mode and an OFDM mode, and that correspond to the default format illustrated in FIGS. 13A and 13B. In particular, FIG. 14A is a diagram of the preamble format 608 for SC mode, and which corresponds to FIG. 13A. FIG. 14B is a diagram of the preamble format 612 for OFDM mode, and which corresponds to FIG. 13B. In the format illustrated in FIGS. 14A and 14B, the complementary sequence b is used in the STF to signal that the packet is a BFT packet. Also in the format illustrated in FIGS. 14A and 14B, the CEF is same length as in the format of FIGS. 13A and 13B. It is noted, however, that the a and b sequences are swapped in the CEF's of FIGS. 14A and 147B as compared to the CEF's of FIGS. 13A and 13B, respectively, so that the preamble includes different sequences at the end of the STF field and at the start of the CEF field. In this manner, the preamble may efficiently signal the beginning of the CEF field.

FIGS. 15A and 15B are diagrams of a preamble format for a BFT packet in both a single carrier (SC) mode and an OFDM mode, and that correspond to the default format illustrated in FIGS. 13A and 13B. In particular, FIG. 15A is a diagram of the preamble format 620 for SC mode, and which corresponds to FIG. 13A. FIG. 15B is a diagram of the preamble format 624 for OFDM mode, and which corresponds to FIG. 13B. In the format illustrated in FIGS. 15A and 15B, the sign of alternate sequences in the STF is flipped as compared to the STF in the default mode preamble to signal that the packet is a BFT packet. Also in the format illustrated in FIGS. 15A and 15B, the CEF is same length as in the format of FIGS. 13A and 13B. It is also noted that the CEF's in FIGS. 14A and 14B are the same as in FIGS. 13A and 13B, respectively.

FIGS. 16A and 16B are diagrams of a preamble format for a BFT packet in both a single carrier (SC) mode and an OFDM mode, and that correspond to the default format illustrated in FIGS. 13A and 13B. In particular, FIG. 16A is a diagram of the preamble format 630 for SC mode, and which corresponds to FIG. 13A. FIG. 16B is a diagram of the preamble format 634 for OFDM mode, and which corresponds to FIG. 13B. In the format illustrated in FIGS. 16A and 16B, the complementary sequence b is used in the STF to signal that the packet is a BFT packet. Also in the format illustrated in FIGS. 16A and 16B, a delimiter field 638 is included between the STF and the CEF. The delimiter field 638 may be useful for improving frame timing reliability, for example. The delimiter field 638 may include one or more sequences a. It is noted that the CEF's in FIGS. 16A and 16B are the same as in FIGS. 13A and 13B, respectively.

FIGS. 17A and 17B are diagrams of a preamble format for a BFT packet in both a single carrier (SC) mode and an OFDM mode, and that correspond to the default format illustrated in FIGS. 13A and 13B. In particular, FIG. 17A is a diagram of the preamble format 640 for SC mode, and which corresponds to FIG. 13A. FIG. 17B is a diagram of the preamble format 644 for OFDM mode, and which corresponds to FIG. 13B. In the format illustrated in FIGS. 17A and 17B, the sign of alternate sequences in the STF is flipped as compared to the STF in the default mode preamble to signal that the packet is a BFT packet. Also in the format illustrated in FIGS. 17A and 17B, a delimiter field 648 is included between the STF and the CEF. The delimiter field 648 may be useful for improving frame timing reliability, for example. The delimiter field 648 may include one or more sequences b. Also in the format illustrated in FIGS. 17A and 17B, the CEF is same length as in the format of FIGS. 13A and 13B. It is noted, however, that the a and b sequences are swapped in the CEF's of FIGS. 17A and 17B as compared to the CEF's of FIGS. 13A and 13B, respectively.

FIGS. 18A and 18B are diagrams of a preamble format for a BFT packet in both a single carrier (SC) mode and an OFDM mode, and that correspond to the default format illustrated in FIGS. 13A and 13B. In particular, FIG. 18A is a diagram of the preamble format 650 for SC mode, and which corresponds to FIG. 13A. FIG. 18B is a diagram of the preamble format 654 for OFDM mode, and which corresponds to FIG. 13B. In the format illustrated in FIGS. 18A and 18B, the complementary sequence b is used in the STF to signal that the packet is a BFT packet. Also in the format illustrated in FIGS. 18A and 18B, a delimiter field 658 is included between the STF and the CEF. The delimiter field 658 may be useful for improving frame timing reliability, for example. The delimiter field 658 may include one or more sequences −b. Also in the format illustrated in FIGS. 18A and 18B, the CEF is same length as in the format of FIGS. 13A and 13B. It is noted, however, that the a and b sequences are swapped in the CEF's of FIGS. 18A and 18B as compared to the CEF's of FIGS. 13A and 13B, respectively.

Referring now to the examples of FIGS. 16A, 16B, 17A, 17B, 18A, and 18B, in an alternative, the CEF may be omitted.

Figure 19:
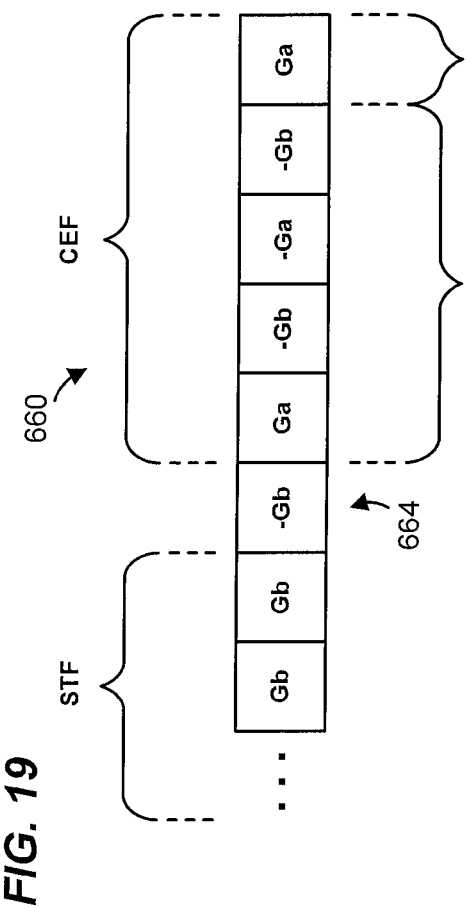
FIG. 19 is diagram of another example spreading for a preamble of a BFT data unit format, wherein a complementary spreading sequence is used in the STF compared to the spreading of FIGS. 13A and 13B.
Figure 20:
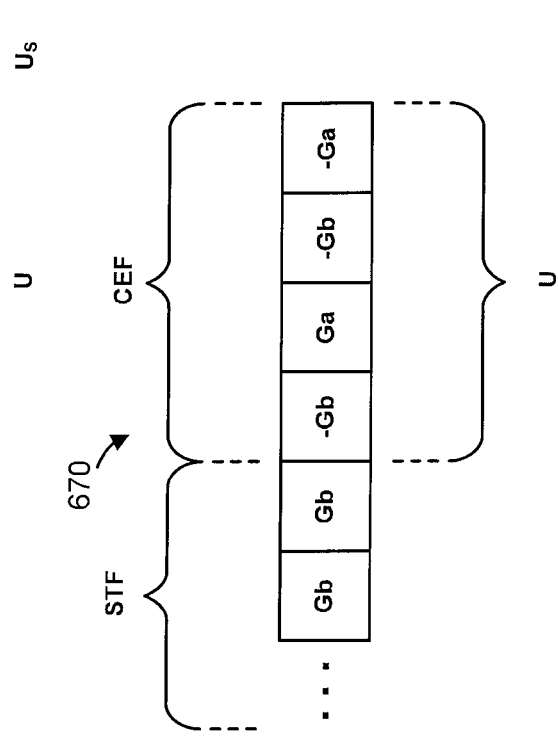
FIG. 20 is diagram of another example spreading for a preamble of a BFT data unit format, wherein a complementary spreading sequence is used in the STF compared to the spreading of FIGS. 13A and 13B.

Referring now to the examples of FIGS. 14A, 14B, 15A, 15B, 16A, 16B, 17A, 17B, 18A, and 18B, in an alternative, the CEF may be of approximately half the length as in the preamble of a default packet. FIG. 19 is an example format 660 for a preamble for a BFT packet in which the BFT packet is signaled by using the complementary sequence b in the STF. The format 660 also includes a delimiter field 664 having one or more –b sequences. Further, the format 660 includes a CEF that includes only one composite sequence u (as opposed to two composite, complementary sequences u and v). The CEF includes a cyclic postfix field us, which is optional and may be omitted in some implementations. FIG. 20 is another example format 670 for a preamble for a BFT packet in which the BFT packet is signaled by using the complementary sequence b in the STF. The format 670 includes a CEF that includes only one composite sequence u (as opposed to two composite, complementary sequences u and v). A first sequence of u (–b) is phase shifted by 180 degrees with respect to the sequences used in the STF. The particular u sequences shown in FIGS. 19 and 20 are not required. Rather, any suitable u (e.g., a Golay sequence) composed of a and b complementary sequences may be utilized. For instance, if there is no delimiter field, u may be selected so that it begins with a complementary sequence to the last sequence in SFD.

Figure 21:
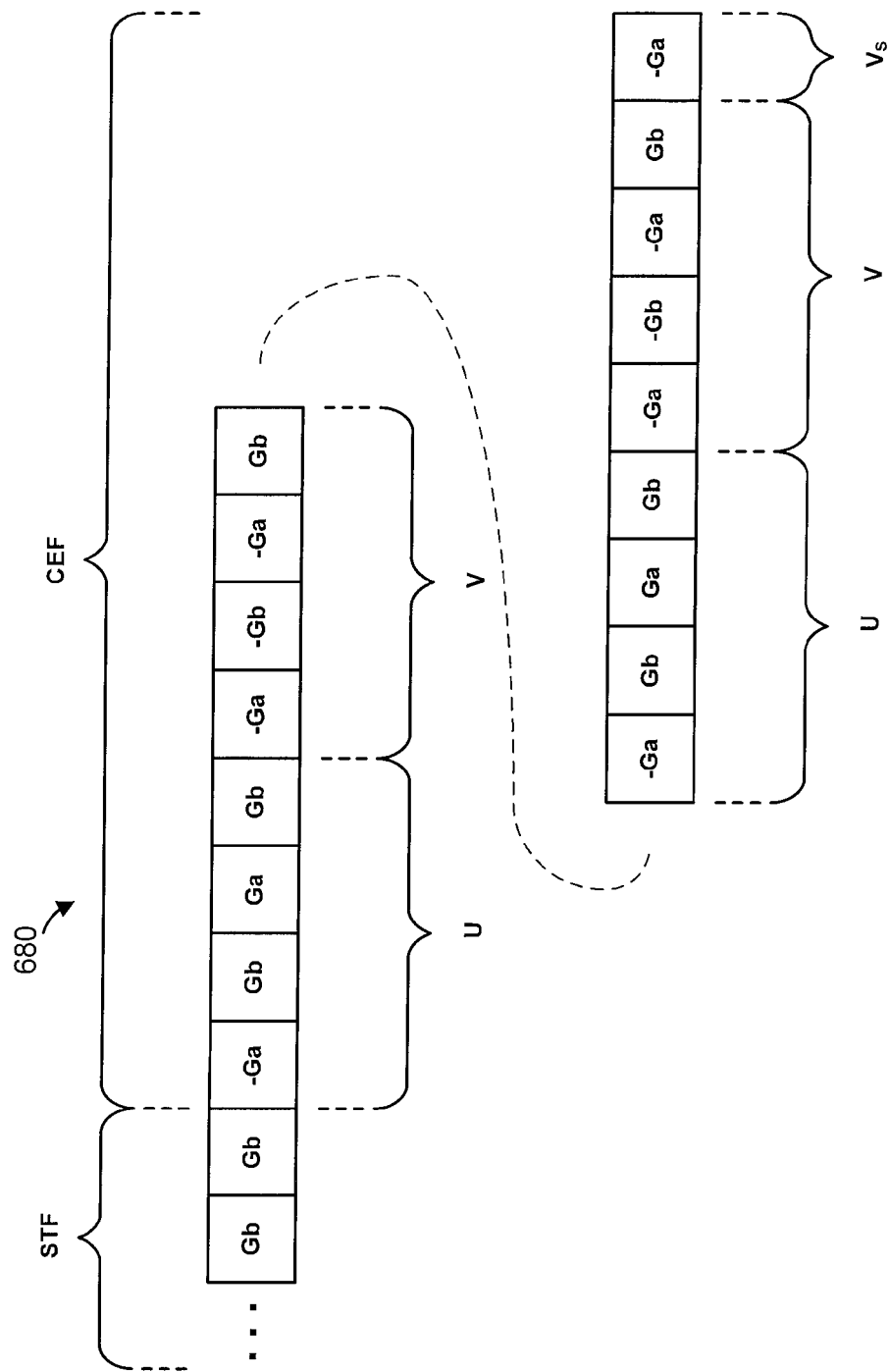
FIG. 21 is diagram of another example spreading for a preamble of a BFT data unit format, wherein a complementary spreading sequence is used in the STF compared to the spreading of FIGS. 13A and 13B.
Figure 22:
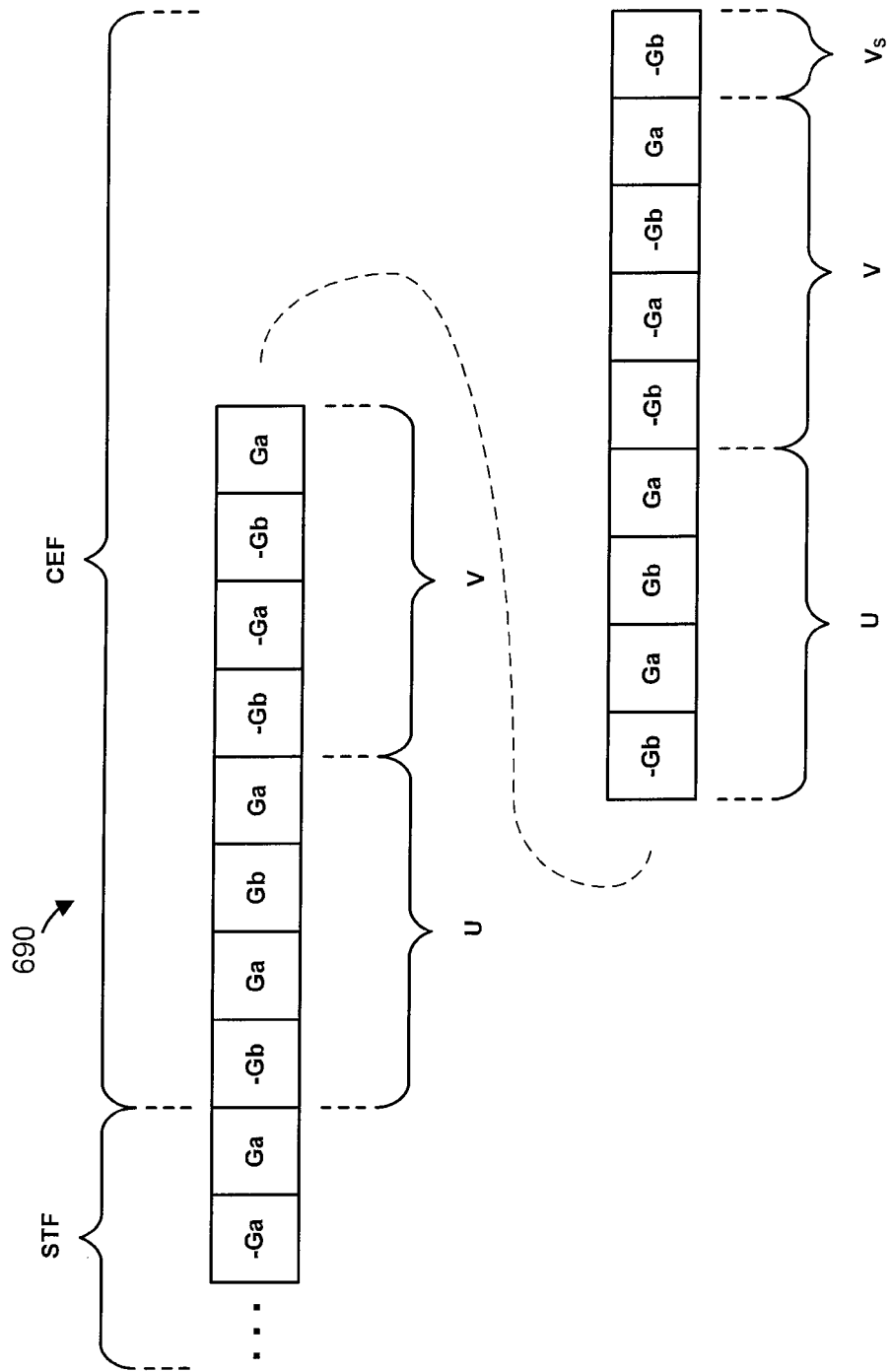
FIG. 22 is diagram of another example spreading for a preamble of a BFT data unit format, wherein a different cover code is used in the STF compared to the spreading of FIGS. 13A and 13B.
Figure 23:
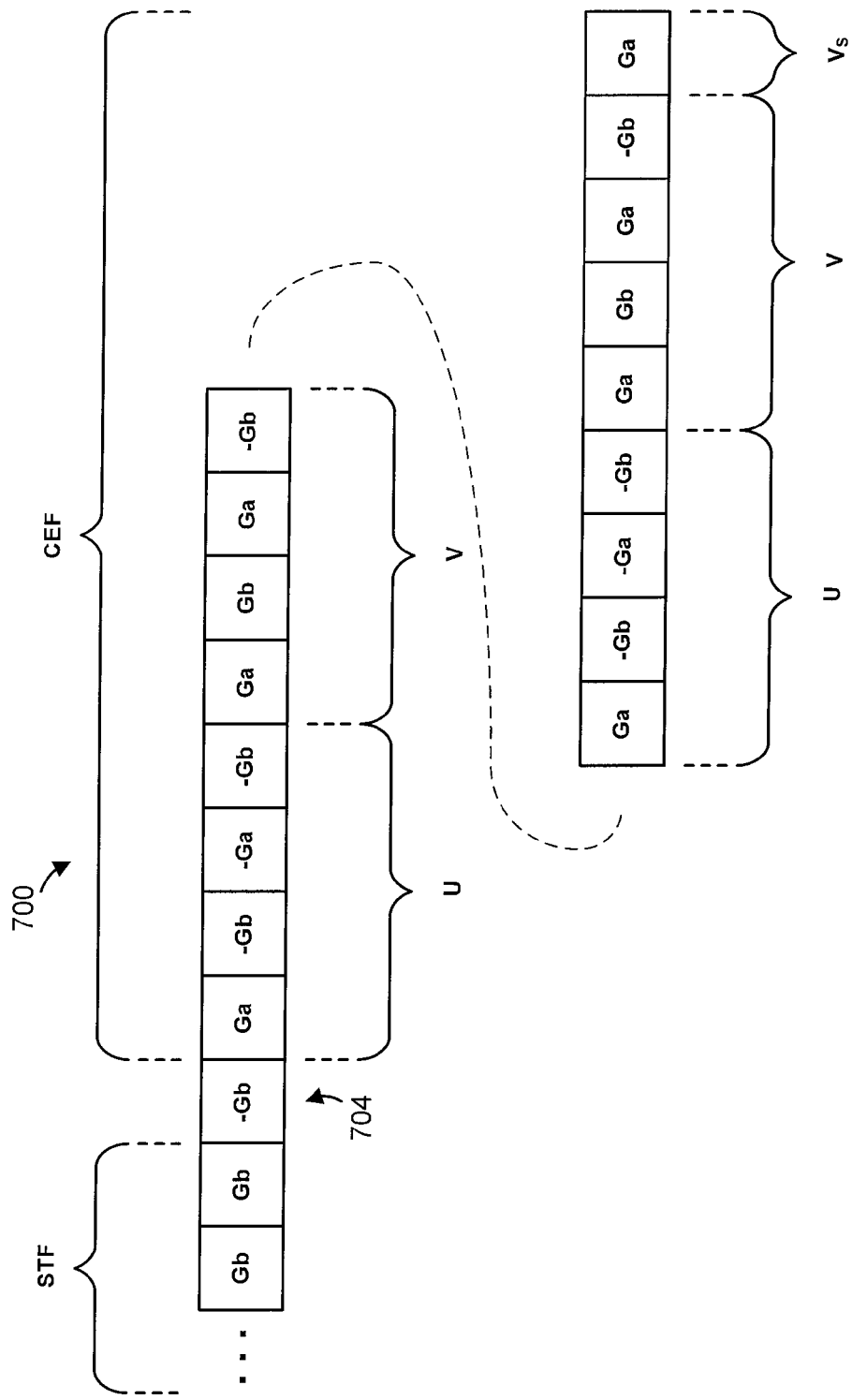
FIG. 23 is diagram of another example spreading for a preamble of a BFT data unit format, wherein a complementary spreading sequence is used in the STF compared to the spreading of FIGS. 13A and 13B.

Referring now to the examples of FIGS. 14A, 14B, 15A, 15B, 16A, 16B, 17A, 17B, 18A, and 18B, in an alternative, the CEF may be approximately multiple times (e.g., 2 or more) the length as in the preamble of a default packet. FIG. 21 is a diagram of an example format 680 for a preamble for a BFT packet in which the BFT packet is signaled by using the complementary sequence b in the STF. The format 680 is similar to the format 608 of FIG. 14A except that the CEF in the format 680 includes two or more u sequences and two or more v sequences. FIG. 22 is a diagram of an example format 690 for a preamble for a BFT packet in which the BFT packet is signaled by using the alternating –a, –a sequences in the STF. The format 690 is similar to the format 620 of FIG. 15A except that the CEF in the format 690 includes two or more u sequences and two or more v sequences. FIG. 23 is a diagram of an example format 700 for a preamble for a BFT packet in which the BFT packet is signaled by using the complementary sequence b in the STF. The format 700 includes a delimiter field 704 having one or more sequences –b. The CEF includes two or more u sequences and two or more v sequences.

In the examples of FIGS. 21-23, as with the examples of FIGS. 14A, 14B, 15A, 15B, 16A, 16B, 17A, 17B, 18A, and 18B, the last sequence of the STF (when no delimiter field) or the last sequence of the delimiter field (when included) may act as a cyclic prefix of the first composite symbol in the CEF. Also, in the examples of FIGS. 21-23, as with the examples of FIGS. 14A, 14B, 15A, 15B, 16A, 16B, 17A, 17B, 18A, and 18B, the last sequence of the composite sequence u may act as a cyclic prefix of v, and vice versa. Similarly, the first sequence of the composite sequence v may act as a cyclic postfix of u, and vice versa. When multiple sequences u and v are included in the CEF, the receiver may generate a channel estimation for each u, v pair, and then combine the results by averaging, for example.

Referring again to FIG. 2, with BFT preamble formats as discussed with reference to FIGS. 14A, 14B, 16A, 16B, 18A, 18B, 19 and 20, the BFT detector 92 may include a correlator configured to cross correlate with the sequence a (an "a correlator") and a correlator configured to cross correlate with the sequence b (an "b correlator"), in one embodiment. In this embodiment, the BFT detector 92 may utilize the output of the a correlator and the output of the b correlator to determine when an SFD of a default packet or an SFD of a BFT packet has been received. With BFT preamble formats as discussed with reference to FIGS. 15A, 15B, 17A and 17B, the BFT detector 92 may include an a correlator and a correlator configured to cross correlate with the sequence –a (a "–a correlator"), in one embodiment. In this embodiment, the BFT detector 92 may utilize the output of the a correlator and the output of the –a correlator to determine when an STF of a default packet or an STF of a BFT packet has been received. In another embodiment for use with preamble formats as discussed with reference to FIGS. 15A, 15B, 17A and 17B, the BFT detector 92 may include an a correlator and may utilize the output of the a correlator to determine when an STF of a default packet or an STF of a BFT packet has been received.

In other embodiments, a BFT packet may be signaled using repeated sequences in the STF that are double the length of a. For example, if a is a length-128 sequence, a BFT packet may be signaled using repeated length-256 sequences in the STF. The length of STF may be the same as in the default mode. In other words, the number of double-length sequences may be one half the number of a sequences in the STF of the default packet. In one embodiment, the double-length sequences are combinations of the complementary sequences a and b. In this embodiment, and if the CEF also utilizes the sequences a and b, an a correlator and a b correlator may be reused for both BFT packet detection and channel estimation in default mode.

A double-length sequence m may be utilized in the STF to signal a BFT packet. The sequence m may be any of the following combinations of the complementary sequences a and b: [b a], [b –a], [a b], or [a –b]. If the sequences a and b are Golay sequences (Ga, Gb), then a double-length Golay sequence Gm may be used, and Gm may be any of the following: [Gb Ga], [Gb –Ga], [Ga Gb], or [Ga –Gb]. If a delimiter field is utilized, the delimiter field may utilize one or more of the following double-length sequences: –m or n, where n is a complementary sequence of m. For example, if m is [b a], [b –a], [a b], or [a –b], then n may be [b –a], [b a], [a –b], or [a b], respectively. If the sequences a and b are Golay sequences (Ga, Gb), and if Gm is [Gb Ga], [Gb –Ga], [Ga Gb], or [Ga –Gb], then n may be a Golay sequence (Gn) and may be [Gb –Ga], [Gb Ga], [Ga –Gb], or [Ga Gb], respectively. In these embodiments in which double-length sequences are utilized in the STF, composite sequences for the CEF may be selected so that the last half-length sequence of the STF (when no delimiter field) or the last half-length sequence of the delimiter field (when included) may act as a cyclic prefix of the first composite sequence in the CEF. For example, if the a sequence is a length-128 sequence, the last 128 chips of the STF (when no delimiter field) or the last 128 chips of the delimiter field (when included) may act as a cyclic prefix of the first composite sequence in the CEF.

Figure 24:
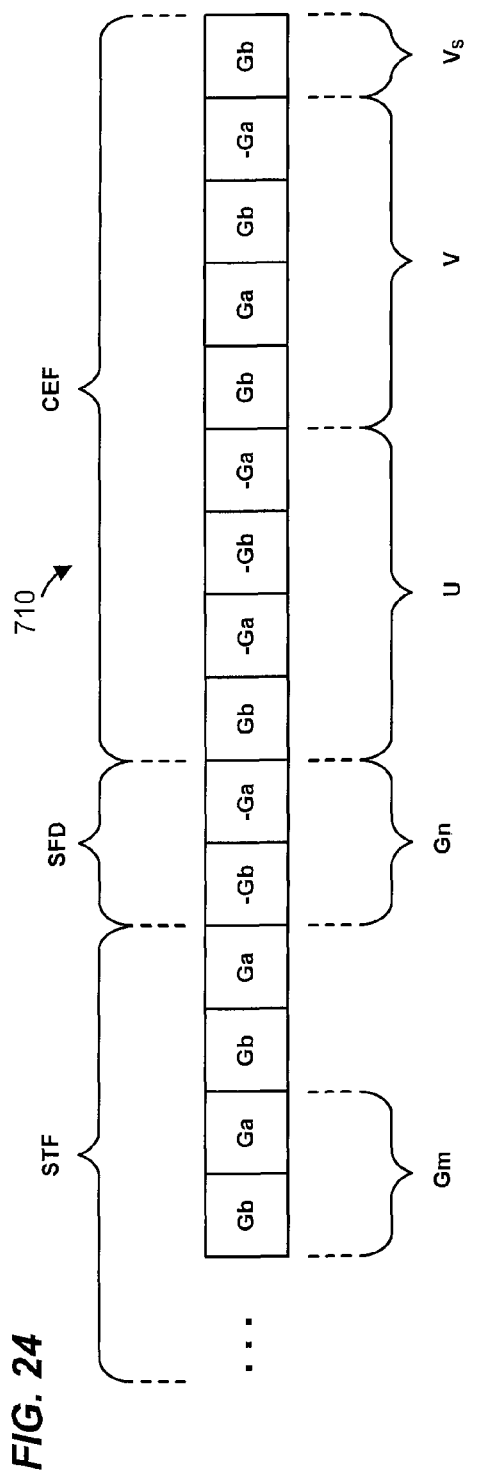
FIG. 24 is diagram of another example spreading for a preamble of a BFT data unit format, wherein a complementary spreading sequence is used in the STF compared to the spreading of FIGS. 13A and 13B.
Figure 25:
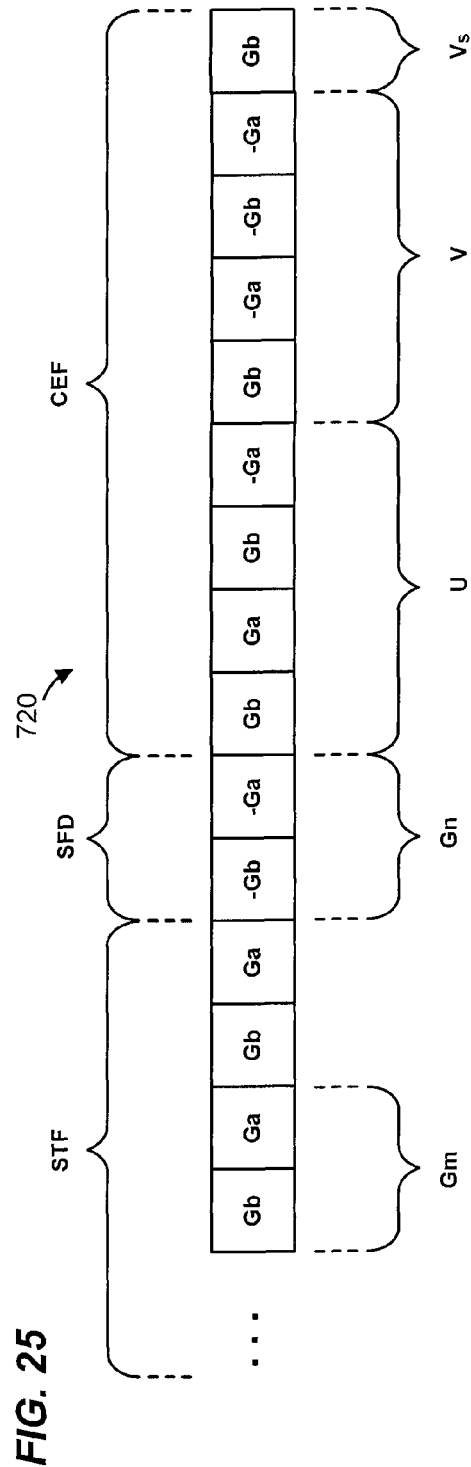
FIG. 25 is diagram of another example spreading for a preamble of a BFT data unit format, wherein a complementary spreading sequence is used in the STF compared to the spreading of FIGS. 13A and 13B.

FIG. 24 is a diagram of an example preamble format 710 for a BFT packet that utilizes a double-length sequence m. A start frame delimiter (SFD) field may include one or more sequences n. A CEF is selected so that the –a sequence in the SFD acts as a cyclic prefix for u. FIG. 25 is a diagram of another example preamble format 720 for a BFT packet that utilizes a double-length sequence m. A delimiter (SFD) may include one or more sequences n. A CEF is selected so that the −a sequence in the SFD acts as a cyclic prefix for u. As can be seen, the u and v sequences are different in the formats of FIGS. 24 and 25. A format for a default packet corresponding to the formats of FIGS. 24 and 25 may utilize a plurality of a sequences.

Referring again to FIG. 2, with BFT preamble formats as discussed with reference to FIGS. 24 and 25, the BFT detector 92 may include a correlator configured to cross correlate with the sequence a (an "a correlator") and a correlator configured to cross correlate with the sequence b (an "b correlator"), in one embodiment. In this embodiment, the BFT detector 92 may utilize the output of the a correlator and the output of the b correlator to determine when an SFD of a default packet or an SFD of a BFT packet has been received. In another embodiment, the BFT detector 92 may include an "a correlator" and a correlator configured to cross correlate with the sequence m (an "m correlator"). In this embodiment, the BFT detector 92 may utilize the output of the a correlator and the output of the m correlator to determine when an SFD of a default packet or an SFD of a BFT packet has been received.

An alternative way for auto-detection is to run 128- and 256-Golay correlators in parallel during the carrier sensing period (i.e. running regular PHY and control PHY carrier sensing in parallel), if the carrier sensing by the 256-Golay correlator claims a valid control PHY signal, then it will always over-write the carrier sensing result for the regular PHY (i.e. the result with the 128-Golay correlator output).

Figure 26:
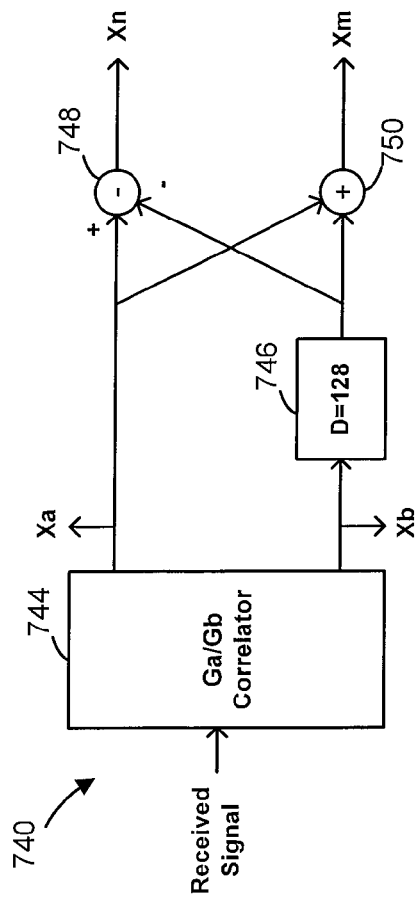
FIG. 26 is diagram of an example correlator that me be used for detecting an STF spread as in FIGS. 24 and 25.

FIG. 26 is an example correlator 740 that may be utilized in embodiments that utilize Gm in the preamble to signal a BFT packet, and where the a and b sequences have lengths of 128. The correlator 740 generates a cross correlation (Xm) of the received signal with the sequence m, and a cross correlation (Xn) of the received signal with the sequence n. The correlator 740 may include a Ga/Gb correlator 744 that generates a cross correlation (Xa) between a received signal and the sequence Ga, and that generates a cross correlation (Xb) between the received signal and the sequence Gb. An Xb output is coupled to a delay line 746 that provides a delay of 128 chips. The correlator 740 also includes a subtractor 748 and an adder 750. The subtractor 748 is coupled to an Xa output of the correlator 744 and to an output of the delay line 746. The subtractor 748 subtracts a delayed version of Xb from Xa to generate Xn. The adder 750 is coupled to the Xa output of the correlator 744 and to the output of the delay line 746. The adder 750 adds the delayed version of Xb to Xa to generate Xm. In the embodiment of FIG. 25, the Ga/Gb correlator 744 can be used also for detecting cross correlations with the sequences a and b. In other embodiments in which the lengths of the a and b are not 128, a different length delay line may be utilized.

Figure 27:
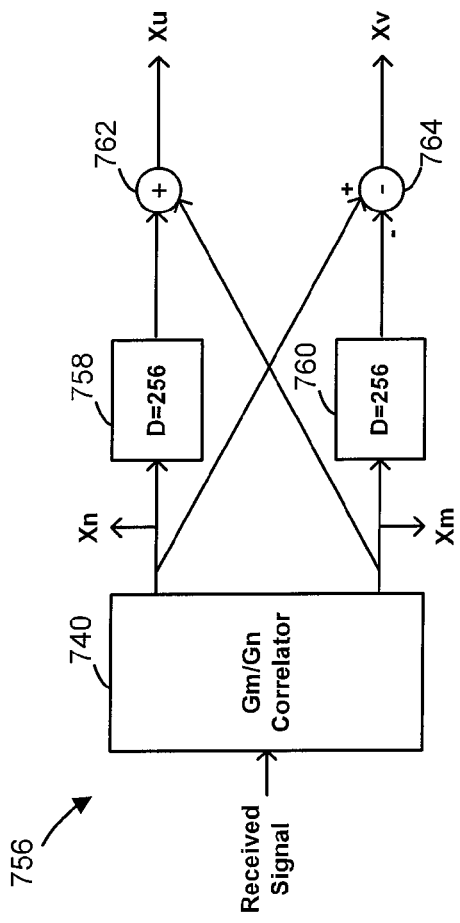
FIG. 27 is diagram of an example correlator that utilize the correlator of FIG. 26.

FIG. 27 is an example correlator 756 that may be utilized in embodiments that utilize Gm in the preamble to signal a BFT packet, and where the a and b sequences have lengths of 128. The correlator 756 generates a cross correlation (Xu) of the received signal with the sequence u, and a cross correlation (Xv) of the received signal with the sequence v. The correlator 756 may include the Gm/Gn correlator 740. The Xn output is coupled to a delay line 758 that provides a delay of 256 chips. An Xm output is coupled to a delay line 760 that provides a delay of 256 chips. The correlator 756 also includes an adder 762 and a subtractor 764. The subtractor 764 is coupled to the Xn output of the correlator 740 and to an output of the delay line 760. The subtractor 748 subtracts a delayed version of Xm from Xn to generate Xv. The adder 762 is coupled to the Xm output of the correlator 740 and to an output of the delay line 758. The adder 762 adds the delayed version of Xn to Xm to generate Xu. In the embodiment of FIG. 25, the Gm/Gn correlator 740 can be used also for detecting cross correlations with the sequences m and n. In other embodiments in which the lengths of the a and b are not 128, a different length delay line may be utilized.

In other embodiments, the BFT packet may be signaled by using a sequence a' in the STF, where a' is neither the same as a nor a complementary sequence of a. The sequence a' may have the same length as a or it may be half the length of a. In these embodiments, the CEF may comprise composite sequences utilizing the complementary sequences a and b. In these embodiments, a delimiter field comprising one or more of the sequence −a' may optionally be included. Also in these embodiments, a cyclic prefix optionally may be included prior to the CEF.

In some embodiments, a BFT packet may be signaled by the spreading sequence used to spread the PHY header. For example, a default packet may utilize the sequence a to spread data in the PHY header, whereas a BFT packet may utilize the complementary sequence b to spread data in the PHY header. In these embodiments, a receiver may detect a BFT packet by cross correlating with the sequences a and b comparing the energy of the two cross correlations. In one specific example, the sequences a and b may be Golay sequences of length 64. Of course, other length sequences may also be utilized.

In some embodiments, there may be multiple types of shortened packets of which the BFT packet is one type. In these embodiments, the shortened packet may be signaled by the preamble as discussed above with respect to FIGS. 14A, 14B, 15A, 15B, 16A, 16B, 17A, 17B, 18A, 18B, and 19-25. In order to then signal a BFT packet as opposed to the other types of shortened packets, other information may be encoded in the preamble and/or the PHY header. For example, the order of u and v in the CEF may be switched to signal a BFT packet. As another example, the spreading sequence used to spread the PHY header may be used to signal whether the packet is a BFT packet. As another example, one or more fields in the PHY header (e.g., the payload length field, the BFTP field, etc.) may signal a BFT packet.

Figure 28:
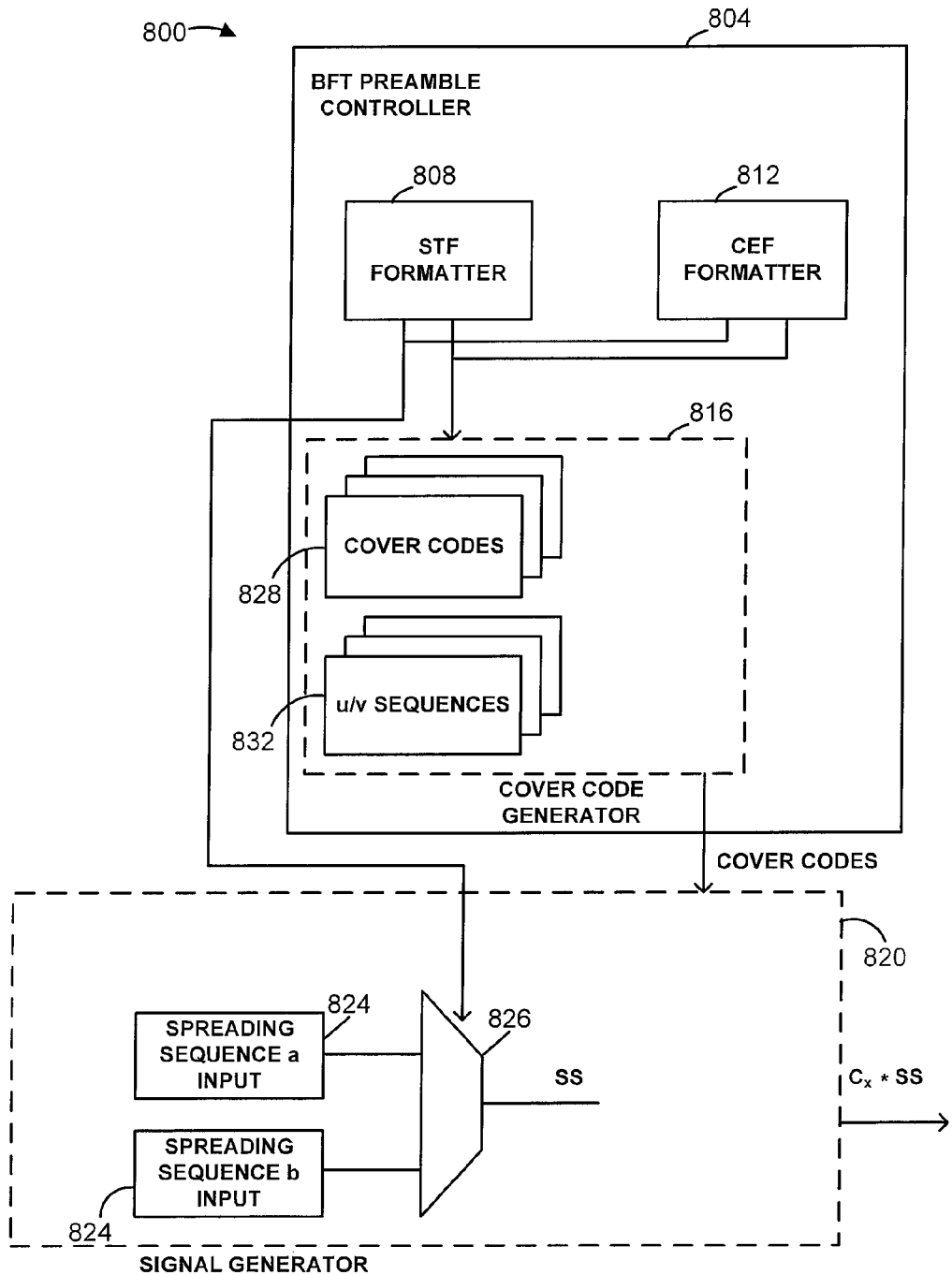
FIG. 28 is a block diagram of an example BFT preamble generator.

FIG. 28 is a block diagram of an example BFT packet preamble generator 800 that may be included in the BFT packet generator 76 (FIG. 2) in embodiments corresponding to FIGS. 14A, 14B, 15A, 15B, 16A, 16B, 17A, 17B, 18A, 18B, and 19-25. The BFT packet preamble generator 800 may include a BFT packet preamble controller 804 that includes an STF formatter 808 and a CEF formatter 812, each of which may be implemented using hardware, a processor executing machine readable instructions, or combinations thereof. Each of the formatters 808 and 812 is communicatively coupled to at least a cover code generator 816 and a signal generator 820.

The signal generator 820 generally receives cover codes and indications of when to generate signals using either a chip sequence a or a chip sequence b from the STF formatter 808, the CEF formatter 812 and the cover code generator 816. The chip sequences a and b are complementary sequences. In some embodiments, the signal generator 820 may include a memory device 824, such as RAM, ROM, or another type of memory, to store the complementary sequences a and b. In other embodiments, the signal generator 820 may include a and b sequence generators. In one embodiments, the signal generator 820 includes a binary selector 826 to select one of the two complementary sequences a and b for preamble signal generation. The two complementary sequences a and b have correlation properties suitable for detection at a receiving device. For example, the complementary spreading sequences a and b may be selected so that the sum of corresponding out-of-phase aperiodic autocorrelation coefficients of the sequences a and b is zero. In some embodiments, the complementary sequences a and b have a zero or almost-zero periodic cross-correlation. In another aspect, the sequences a and b may have aperiodic cross-correlation with a narrow main lobe and low-level side lobes, or aperiodic auto-correlation with a narrow main lobe and low-level side lobes. In some of these embodiments, the sequences a and b are complementary Golay sequences. Although various lengths of the sequences a and b may be utilized, each of the sequences a and b, in some of the embodiments, has a length of 128-chips.

The cover code generator 816 may include a memory device 828, such as RAM, ROM, or another type of memory, to store sets of cover codes. Similarly, the cover code generator 816 may include a memory device 832, such as RAM, ROM, or another type of memory, to store u/v sequences. The cover code generator 816 also may include one or more other memory devices to store other sequences that span all or parts of the STF field, all or parts of CEF field, or both the STF field and the CEF field. In response to commands from the STF formatter 808 and the CEF formatter 812, the cover code generator 816 may generate cover codes for a particular PHY preamble.

From the foregoing, it will be appreciated that the BFT packet preamble controller 804 may control the signal generator 820 to generate a BFT packet preamble using only one pair of sequences a and b. In some embodiments, however, in addition to the sequences a and b, the BFT preamble controller 804 may also control the signal generator 820 to utilize other sequences a' and b' to generate a BFT preamble.

Figure 29:
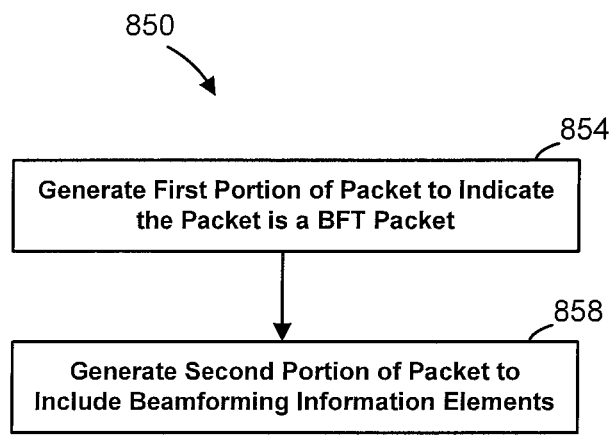
FIG. 29 is a flow diagram of an example method for generating a BFT packet.

FIG. 29 is a flow diagram of an example method 850 for generating a BFT packet. The method 850 may be utilized in a wireless communication system in which communication devices exchange information utilizing data units that conform to a first format that includes a MAC header. The BFT packet conforms to a second format that is different than the first format. The method 850 may be implemented by a transmitter such as the transmitter 12 of FIG. 2.

At block 854, a first portion of a packet may be generated to indicate that the packet is a BFT packet. The first portion of the packet may include a preamble and at least a portion of the PHY header, and the first portion of the packet conforms to the second format. At block 858, a second portion of the packet is generated according to the second format. The second portion of the BFT packet includes BFT training information elements.

Figure 30:
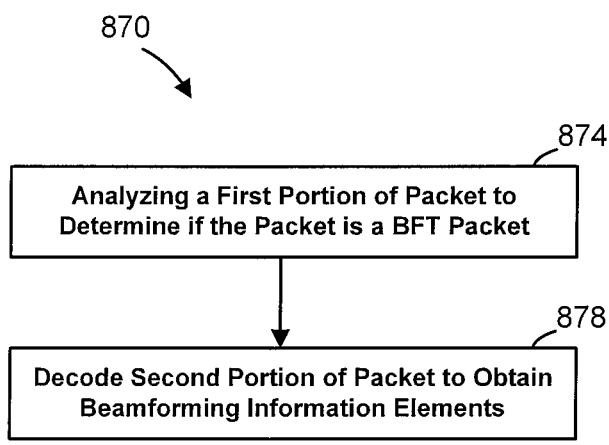
FIG. 30 is a flow diagram of an example method for detecting and utilizing a received BFT packet.

FIG. 30 is a flow diagram of an example method 870 for decoding a BFT packet. The method 870 may be utilized in a wireless communication system in which communication devices exchange information utilizing packets that conform to the first format, wherein the BFT packets conform to the second format. The method 850 may be implemented by a receiver such as the receiver 14 of FIG. 2.

At block 874, a first portion of a received packet is analyzed to determine if the received packet is a BFT packet. The first portion of the received packet may include a preamble and at least a beginning portion of the PHY header. If the received packet is determined to be a BFT packet, BFT information elements in a second portion of the BFT packet may be decoded at block 878. The second portion of the BFT packet conforms to the second format.

Figure 31:
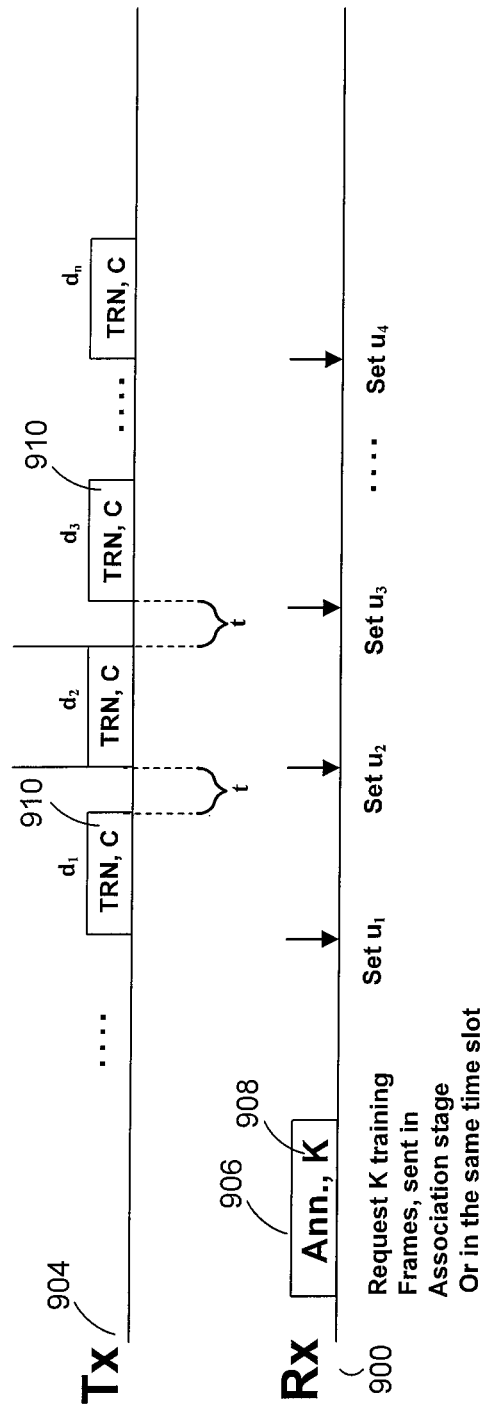
FIG. 31 is a timing diagram of an example beamforming training method that may utilize BFT packets.

In general, any pair of communicating devices (or "stations") in which at least one of the stations has multiple antennas may utilize the BFT packet formats discussed above during a beamforming training procedure. One example of a beamforming training procedure in connection with a multi-antenna station 900 (Rx) and another station 904 (Tx) will be described with reference to FIG. 31. FIG. 31 is a timing diagram that illustrating data transmitted between the station 900 and the station 904 during an example beamforming training procedure. The station 900 includes two or more antennas, whereas the station 904 may include one or more antennas. To identify an efficient (or, at least, a relatively good) receive steering vector $u_{RX}$, the multi-antenna station 900 may iteratively apply a series of receive steering vectors $u_1, u_2, \ldots u_n$ to the antenna array of the station and receive all or some of BFT packets (e.g., packets, frames, etc.) $d_1, d_2, \ldots d_n$ at the antenna array for some or all of the receive steering vectors $u_1, u_2, \ldots u_n$. In this sense, each of the receive steering vectors $u_1, u_2, \ldots u_n$ corresponds to one of the BFT packets $d_1, d_2, \ldots d_n$ (e.g., $u_1$ corresponds to $d_1$, $u_2$ corresponds to $d_2$, etc.), although some of the BFT packets $d_1, d_2, \ldots d_n$ may not always reach the station 900. The station 900 may assess the quality of each received BFT packet $d_1, d_2, \ldots d_n$, using any desired technique. Preferably, the peer station 904 transmits the BFT packets $d_1, d_2, \ldots d_n$ using the same transmit steering vector (or an omni or quasi-omni transmit pattern mode, a single antenna, etc.) so as to allow the receiving station 900 to assess the quality of received BFT packets $d_1, d_2, \ldots d_n$ in view of the parameters of only the receiving antenna array. The station 900 may then select a receive steering vector $u_{RX}$ from or based on the set of steering vectors $u_1, u_2, \ldots u_n$ based on the relative quality of received data units. In this manner, the station 900 performs beamforming in the inbound direction (Rx beamforming) by conducting a sector sweep.

In some embodiments, the receive steering vector $u_{RX}$ need not precisely match any of the steering vectors $u_1, u_2, \ldots u_n$, and the station 900 may use the quality metrics associated with the received sequence of BFT packets $d_1, d_2, \ldots d_n$ to extrapolate the desired receive steering vector $u_{RX}$. In other embodiments, the station 900 may average several steering vectors u (e.g., top two, top three, etc.) to determine the receive steering vector $u_{RX}$. In general, it is possible to apply any suitable algorithm to generate the receive steering vector $u_{RX}$ based on the assessed quality of data units corresponding to the set $u_1, u_2, \ldots u_n$ (or a subset thereof).

The station 900 may use any desired technique to assess the quality of a received training data unit d. For example, the station 900 may measure the strength of the received signal, calculate the signal-to-noise ratio (SNR) of the signal associated with the training data unit d, assess the bit error rate (BER) of the data in the data unit d, etc. In general, any suitable methodology for measuring the quality of wireless reception may be utilized.

The station 904 may transmit the BFT packets $d_1, d_2, \ldots d_n$ as BFT packets using the most reliable modulation and coding scheme (MCS) set available to the stations 900 and 904. The stations 900 and 904 may thus increase the probability that the training data unit d successfully propagates from the station 904 to the station 900.

With continued reference to FIG. 2, the station 900 may transmit an announcement packet 906 to the station 904 to request that the peer station 900 begin transmitting the series of BFT packets $d_1, d_2, \ldots d_n$. In some embodiments, the announcement packet 906 may include a count 908 that specifies the number N of BFT packets in the sequence $d_1, d_2, \ldots d_n$. In other embodiments, the number N may be specified by the communication protocol shared by the stations 900 and 904, pre-set by a network controller (not shown), negotiated by the stations 900 and 904 during another protocol stage, or otherwise agreed upon by the stations 900 and 904. In yet another embodiment, the peer station 904 may include a countdown identifier 910 (C) in each BFT packet d in the sequence $d_1, d_2, \ldots d_n$ to indicate how many BFT packets are scheduled to follow the BFT packet d. As another alternative, the stations 900 may not know how many BFT training packets form the sequence $d_1, d_2, \ldots d_n$, and may stop processing training packets in response to detecting another condition such as, for example, identifying a sufficiently acceptable steering vector u, upon expiration of a timer, after receiving data units via a set number of different steering vectors u, etc.

The announcement packet 906 may conform to the default packet format (i.e., it may not be a BFT packet). The PSDU of the announcement packet 906 may include a MAC header indicating source and destination MAC addresses corresponding to the stations 900., 904. A MAC subfield in the announcement packet 906 may also indicate that BFT training packets will follow. In one embodiment, the announcement packet 906 may also include information (e.g., in one or more MAC subfields) to indicate IEs for beamforming that cannot solely be signaled by PHY headers of a BFT packet.

In some instances, the announcement packet 906 may be omitted. For example, in a TDMA slot assigned to a particular pair of stations, the source/destination addresses are already known to stations 900 and 904. Also, a BFT packet may be long enough to include all necessary IEs.

The station 900 may transmit the announcement packet 906 during an association stage or a beacon stage of a network in which the stations 900 and 904 operate. For example, the stations 900 and 904 may operate in a piconet in which a network controller may schedule timeslots for various stages of network formation as well as a timeslot for beamforming in the Rx and/or Tx directions. In at least some piconet embodiments, the stations 900 and 904 may initiate and/or negotiate a beamforming procedure via the network controller. In particular, the station 900 may send a request to initiate Rx beamforming to the network controller and specify the number of BFT packets the station 904 should send to the station 900. The request may be scheduled, mandated at a particular stage by the communication protocol, or initiated on an ad hoc basis.

If desired, the stations 900 and 904 may perform Rx beamforming in the same timeslot in which the station 900 sends the announcement packet 906 to the station 904. Alternatively, the announcement packet 906 may be sent in a first timeslot and the BFT packets d may be sent in a second time slot. Additionally or alternatively, the network controller may schedule Rx and Tx beamforming in one or both directions (i.e., Rx and Tx beamforming at station 900 and Rx and Tx beamforming at station 904).

As illustrated in FIG. 31, the station 900 may initially apply the steering vector $u_1$ to its antenna array prior to receiving the BFT packet $d_1$, and switch the steering vector from $u_1$ to $u_2$ at any time after receiving the BFT packet $d_1$ but before the expected arrival of the training data unit $d_2$. Preferably, the BFT packets $d_1, d_2, \ldots d_n$ are equal in length and are separated by a constant interval t (e.g., an interframe space (IFS)) so that the station 900 can correctly switch the steering vector u even if one or several BFT packets d are lost.

In general, a multi-antenna station (e.g., the station 900) may a similar beamforming training procedure both for receive (Rx) beamforming training and for transmit (Tx) beamforming training. In particular, the station may identify an efficient transmit steering vector $u_{TX}$ by transmitting a series of BFT packets $d'_1, d'_2, \ldots d'_n$ to a peer station, for example, while applying different steering vectors $u'_1, u'_2, \ldots u'_n$ to the antenna array of the station for each transmitted BFT packet. If equipped with multiple antennas, the peer station (e.g., the station 904) preferably applies the same steering vector to the antenna array of the peer station during Tx beamforming by sector sweeping. The peer station may assess the relative quality of each of the BFT packets $d'_1, d'_2, \ldots d'_n$ actually received at the peer station and, upon receiving or failing to receive the last BFT packet $d'_n$, communicate the identity of the BFT packet associated with the best quality metric in the received series to the multi-antenna station conducting Tx beamforming. Alternatively, the peer station may communicate the identities of some number of the BFT packets corresponding to the best quality metrics (e.g., top two, top three, etc.). In general, the peer station may apply any suitable selection criterion to the received BFT packets. As yet another alternative, the peer station may communicate to the multi-antenna station the quality metrics of all BFT packets d' received at the peer station. The multi-antenna station may then select the transmit steering vector $U_{TX}$ in view of the feedback from the peer station.

If desired, the stations 900 and 904 may perform beamforming by combining Rx sector sweeping with Tx sector sweeping in one or both directions. As discussed in greater detail below, a beamforming protocol may mandate Rx sector sweeping after Tx sector sweeping, for example. However, it will be also noted that for some well-calibrated multi-antenna stations 900 and 904, the effective wireless channels H may be reciprocal in forward and reverse directions (i.e., $H_{FW} = H_{RV}^T$), and the transmit and receive properties of the stations 900 and 904 may be symmetrical. In these cases, the stations 900 and 904 may realize bidirectional beamforming using sector sweeping in only one direction. As one example, the station 900 may determine the receive steering vector $u_{RX}$ using the beamforming by sector sweeping as discussed above, and then set its transmit steering vector $U_{TX}$ to $U_{RX}$. As another example, the station 900 communicate the vector $u'_{TX}$ to the station 904, and the station 904 may simply set its receive steering vector $u'_{RX}$ to $u'_{TX}$.

Figure 32:
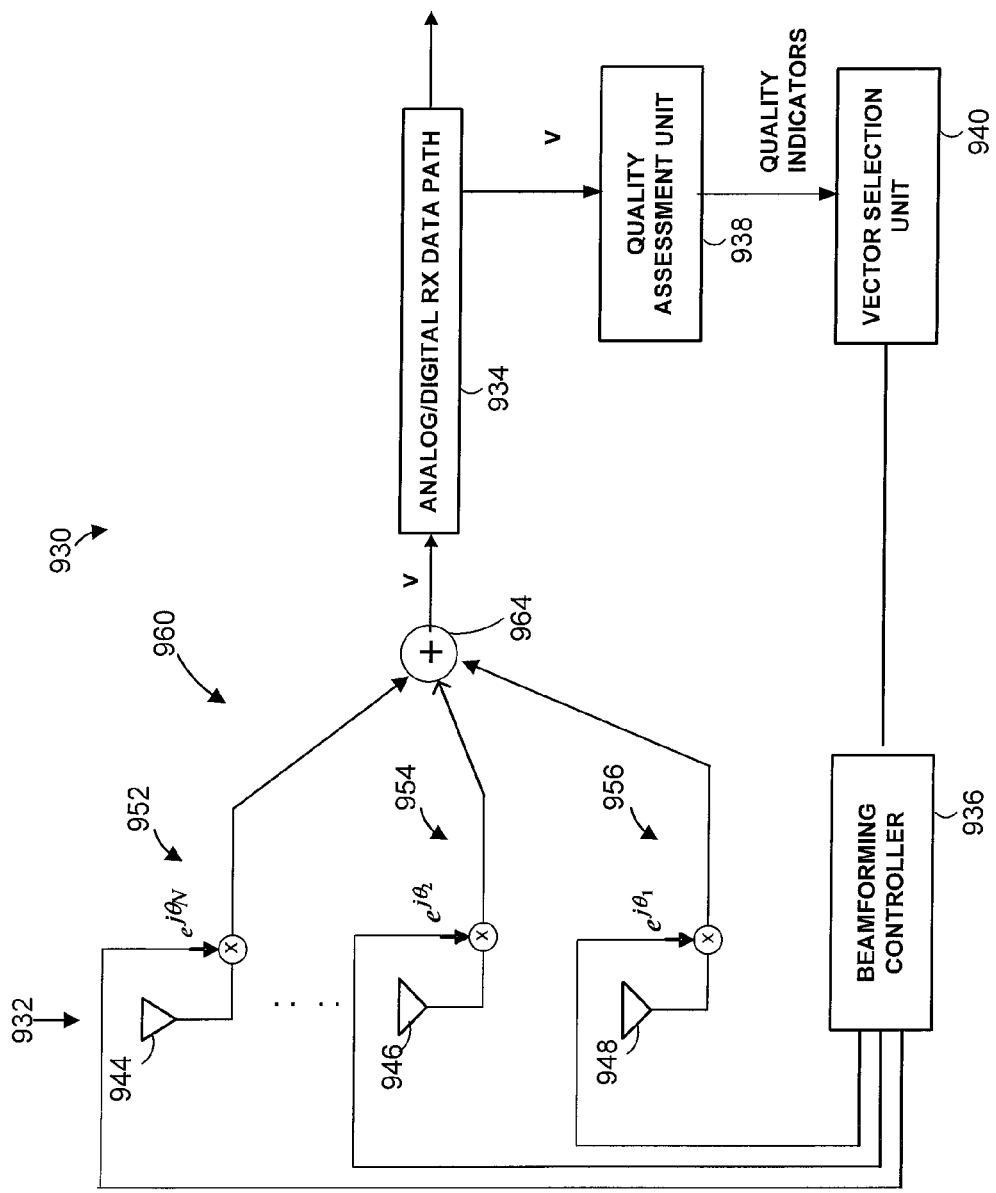
FIG. 32 is a block diagram of an example communication device that may utilize BFT packets for beamforming training.

FIG. 32 is a diagram of an example receiver architecture 930 that includes an antenna array 932, an analog/digital receiver data path 934, a beamforming controller 936, a quality assessment unit 938, and a vector selection unit 940. The antenna array 932 has n antennas including antennas 944, 946, and 948 coupled to respective delay lines 952, 954, and 956, which may be digitally controllable and which define a beamforming network 960. Each of the delay lines 952, 954 and 956 can shift the signal received from the corresponding antenna 944, 946, or 948 by a phase shifting angle θ. Together, the antenna array 932 and the delay lines 952, 954, and 956 define a phased array of the station 930. During an Rx beamforming procedure, the beamforming controller 936 may iteratively step through a sequence of steering vectors $u_1, u_2, \ldots u_n$ as discussed above with reference to FIG. 31, and apply the phase shifting angles $\theta_1, \theta_2, \ldots \theta_n$ to the digitally controllable delay lines 952, 954, and 956 according to a current value of the vector u. Together, the received and phase-shifted signals define a received signal vector $v = [e^{j\theta_N}, e^{j\theta_{N-1}}, \ldots, e^{j\theta_2}, e^{j\theta_1}]$.

As illustrated in FIG. 32, the antennas 944, 946, 948 may share a common analog/digital receive data path to reduce the implementation cost of the station 930. To this end, an adder 964 may use any suitable technique to combine the signals from the antennas 944, 946, 948, shifted by the corresponding angles $\theta_1, \theta_2, \ldots \theta_n$, prior to supplying the combined received signal vector v to the shared analog/digital receive data path 934. In other embodiments, each of the antennas 944, 946, 948 and the corresponding delay line 952, 954, 956 may be coupled to a separate data path. As is generally known, the analog/digital receive data path 934 may include some or all of such components as an equalizer, a decoder, a de-interleaver, a demodulator, an A/D converter, a Fast Fourier Transform (FFT) processing block, etc.

The analog/digital receive data path 934 may additionally supply the combined signal received signal vector v (optionally processed by one or more of the components in the receive data path 934) to the quality assessment unity 938. As indicated above, the quality assessment unity 938 may use any desired technique to generate a quality indicator or metric for the signal vector v. The quality assessment unity 938 may then supply each calculated quality indicator to the vector selection unit 940. Alternatively, the quality assessment unity 938 may supply only some of the quality indicators (e.g., quality indicators exceeding a certain threshold value) to the vector selection unit 940 which, in turn, may communicate with the beamforming controller 936 to determine which of the steering vectors $u_1, u_2, \ldots u_n$ yielded the one or several selected quality indicators.

Generally with respect to the receiver architecture illustrated in FIG. 3, it will be noted that various ones of the modules 934, 936, 938, 940 may be implemented using hardware, machine readable instructions executed by a processor, or combinations thereof. Moreover, some of the components 934, 936, 938, 940 may be custom integrated circuits, application-specific integration circuits (ASICs), etc., communicatively coupled by electrical busses, for example. Further, the delay lines 952, 954, 956 may be digitally or analog controllable.

Figure 33:
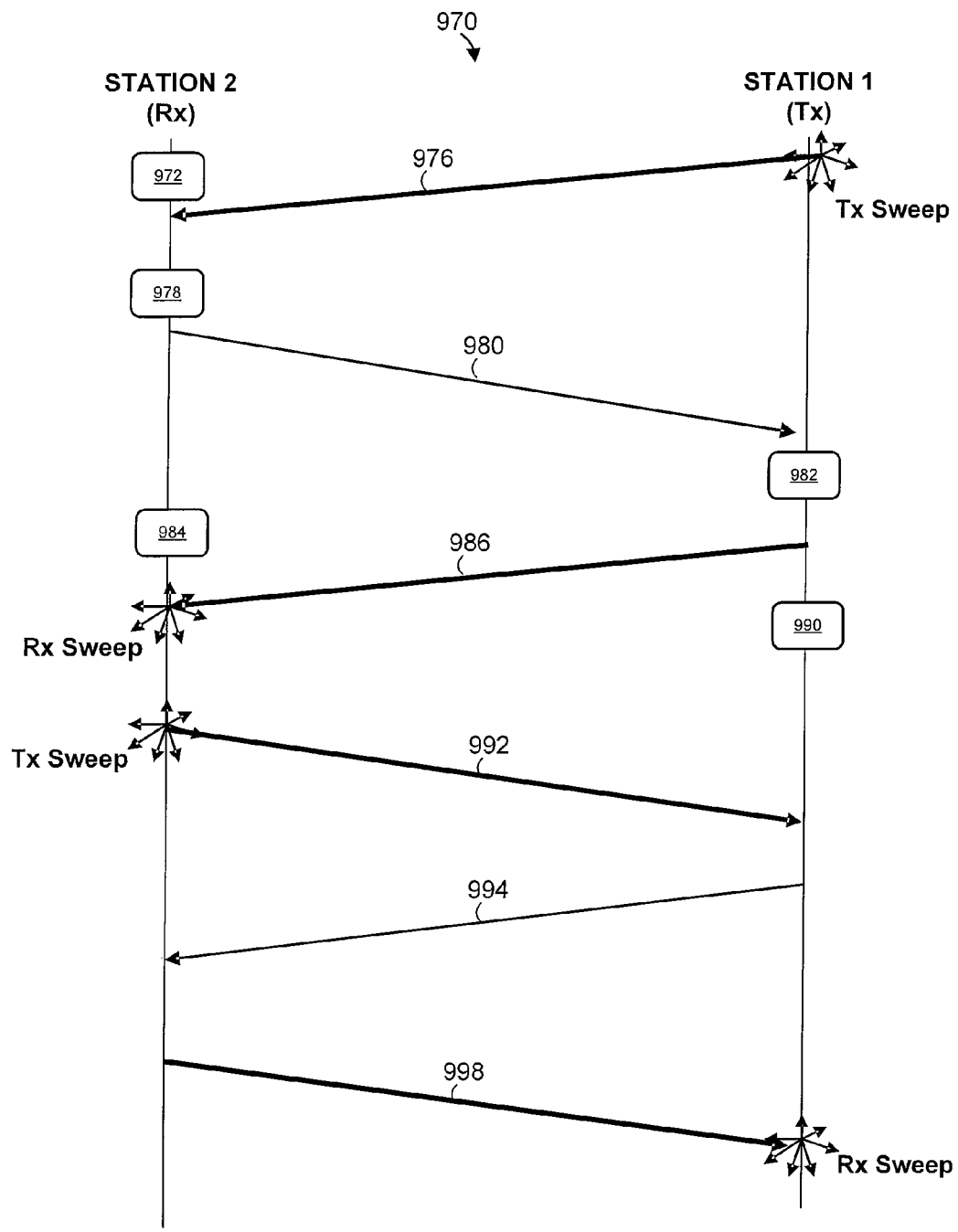
FIG. 33 is a signal diagram of an example beamforming training method that may utilize BFT packets.
Figure 34:
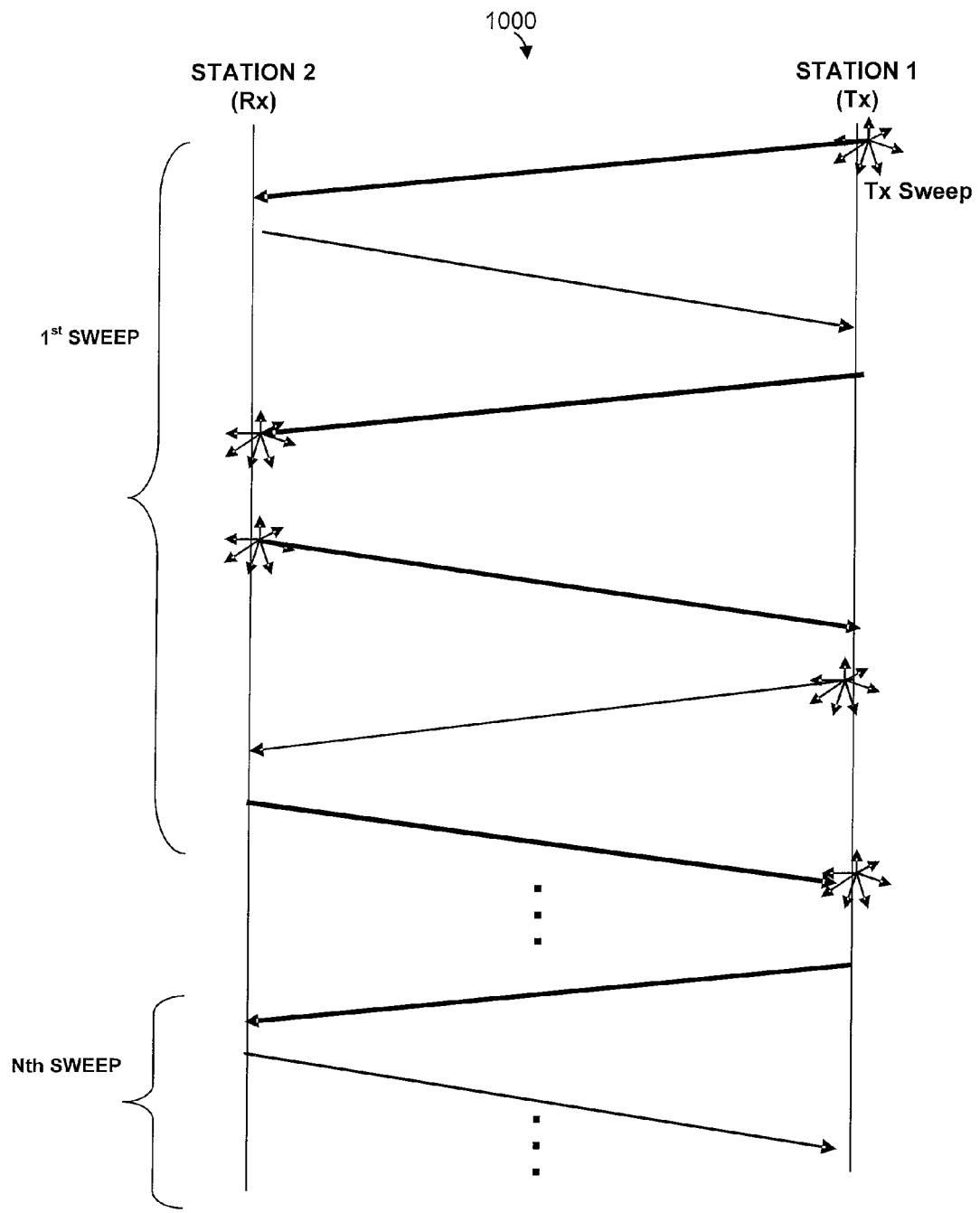
FIG. 34 is a signal diagram of another example beamforming training method that may utilize BFT packets.
Figure 35:
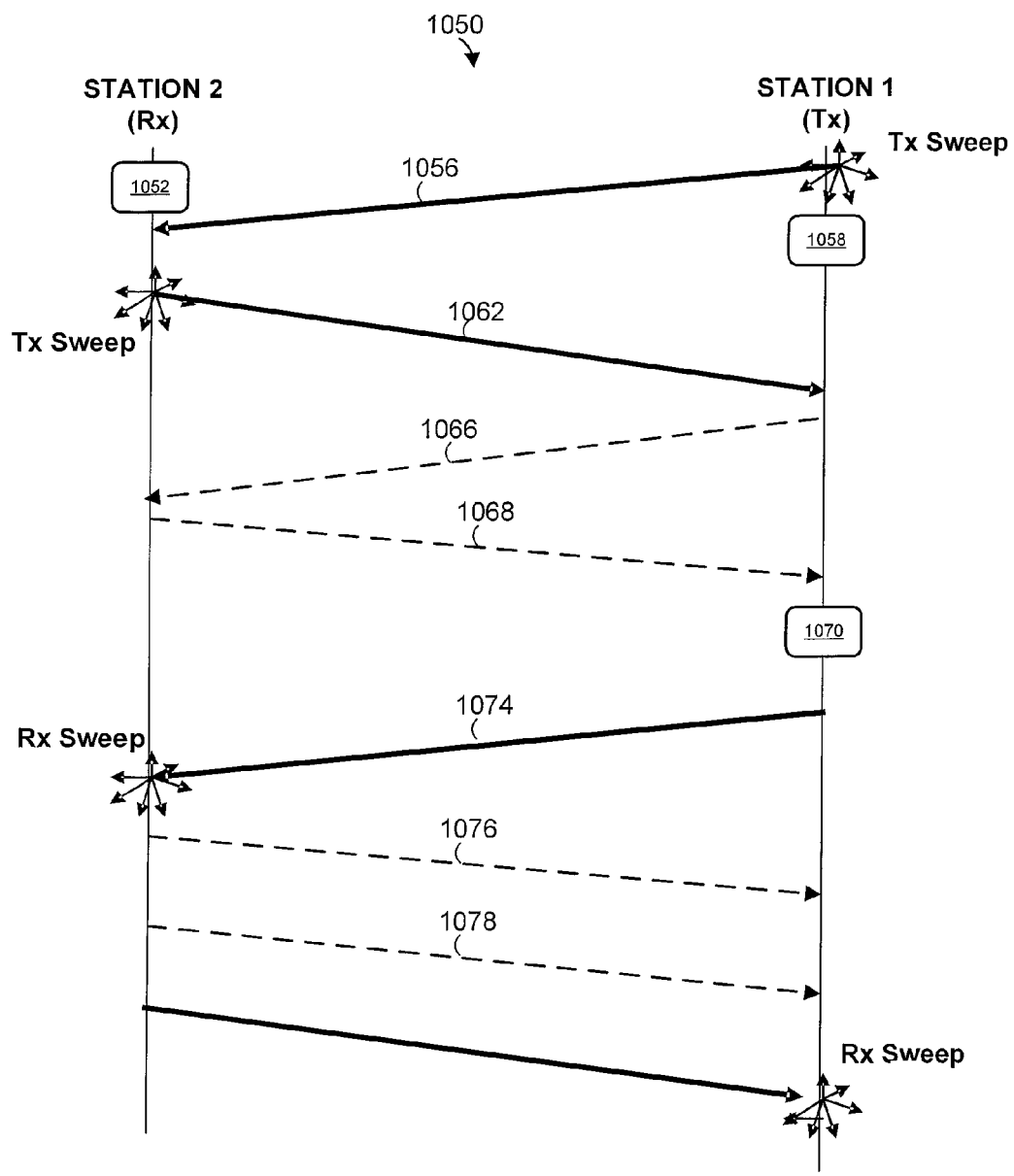
FIG. 35 is a signal diagram of another example beamforming training method that may utilize BFT packets.

Next, FIGS. 33-35 are message sequence diagrams corresponding to several example methods that a pair of communicating devices (e.g., 12 and 14 of FIGS. 1, 2) may utilize, to support the beamforming techniques discussed above and utilizing BFT packets discussed above. The methods discussed with reference to FIGS. 33-35 may be implemented as general beamforming protocols for WPAN, WLAN, and other types of networks. In this regard, it will be noted that some of the messages or steps of these methods may be omitted depending on the availability of multiple antennas at each of the pair of communicating devices, desired level of robustness, computational complexity, channel symmetry, etc.

Referring to FIG. 33, a method 970 provides a joint bidirectional Tx and Rx sector sweeping for Tx and Rx beamforming. If implemented by a pair of multi-antenna devices 12 and 14, for example, station 2 with a timeline illustrated on the left may correspond to the device 14, and station 1 with a timeline illustrated on the right may correspond to the device 12. However, it will be understood that the terms "transmitter"/"transmitting device" and "receiver"/"receiving device" merely refer to operational states of physical devices and are not intended to always limit these devices to only receiving or transmitting in the respective communication network. For example, the device 14 in FIG. 1 may operate as a transmitter and the device 12 may operate as a receiver at some point during operation.

In state 972, station 2 sets its antenna array to an omni receive pattern mode $omni_{RX}$ in preparation for a sector sweeping procedure for Tx beamforming that station 1 initiates to determine the transmit steering vector $u_{TX}^1$. As discussed above, stations 1 and 2 may have negotiated the timeslot for the Tx beamforming procedure in advance or, as another example, a network controller may have allocated one or several timeslots for some or all of the message exchanges of the method 970. Station 1 transmits a sequence 976 of BFT packets which may be similar to the BFT packets $d_1, d_2, \ldots d_n$ discussed with reference to FIG. 32. The sequence 976 may include BFT packets of equal size spaced apart at equal intervals (e.g., IFS) and having an identifier such as a sequence number, for example. Station 1 utilizes a different steering vector u for transmitting each BFT packet in the sequence 976.

Station 2 may receive the entire or partial (e.g., reduced by loss, rejection, etc.) sequence 976 and assess the quality of each BFT packet in the sequence 976 as discussed above with reference to FIG. 32. In or immediately prior to state 978, station 2 may evaluate the quality of the received BFT packets. Because station 2 receives the sequence 976 using an omni receive pattern, the quality of each received data unit depends primarily on the steering vector u that station 1 used to transmit the BFT packet. Upon identifying the best received BFT packet (i.e., the BFT packet corresponding to the best evaluated quality), station 2 may send a feedback message 980 to station 1 prior to transitioning to state 984. Accordingly, the feedback message 980 may include the identifier included in the best received data unit. The feedback message 980 may be transmitted in a default packet or a BFT packet, for example.

In other embodiments, station 2 may report more than one identifier to station 1 in the message 980. For example, station 2 may report the identifiers of "top three" BFT packets received as a part of the sequence 976, the best and the worst received BFT packets to allow station 1 to assess the spread in transmit quality, identifiers of all received BFT packets along with the corresponding quality metrics, or any other desired report related to the sequence 976.

Optionally, the message 980 may include a request to initiate an Rx sector sweeping procedure at station 2. In the example of FIG. 33, the message 980 includes the request along with an informational element (IE) identifying the number of BFT packets $N_2$ to be transmitted to station 2 during the Rx sector sweeping procedure. Upon receiving message 980, station 1 may compare the reported one or several identifiers in the message 980 to the sequence of steering vectors used to transmit the sequence 976 of training data units, and apply any desired selection algorithm to the one or several identifiers to select the transmit steering vector $u_{TX}^1$. As one example, station 1 may simply choose the steering vector used to transmit the identified best training data unit as $u_{TX}^1$.

In or immediately prior to state 982, station 1 may apply the transmit steering vector $u_{TX}^1$ to its antenna array. It will be noted that in state 982, station 1 can already determine which steering vector yields an (at least relatively) efficient gain pattern in transmitting data to station 2. Of course, the channel H may evolve with time and station 1 may need to re-evaluate the transmit steering vector $u_{TX}^1$ at a later time. In this example, however, station 1 may assume that Tx sector sweeping using the sequence 976 provided a transmit steering vector acceptable at least for the duration of the method 970. Station 1 may then proceed to transmit $N_2$ BFT packets to station 2 (sequence 986), preferably using the steering vector $u_{TX}^1$.

Similar to the Tx sector sweep procedure of station 1, station 2 may receive the entire or partial sequence 986 and assess the quality of each data unit in the sequence 986 using any desired technique. Station 2 may apply a different steering vector u to its antenna array for each training data unit received as part of the sequence 986. Upon receiving the entire sequence 986 (or a local timeout event indicating that station 1 has completed the transmission of the sequence 986), station 2 may select the best one or several steering vectors and determine the receive steering vector $u_{RX}^2$ using the selection. This procedure is similar to the technique discussed above with reference to FIG. 32.

If stations 1 and 2 are well calibrated, exchanging the remaining messages of the method 970 may be unnecessary. Instead, station 1 may simply assign the $u_{RX}^1=u_{TX}^1$, and station 2 may similarly assign $u_{TX}^2=u_{RX}^2$.

If, however, stations 1 and 2 cannot assume sufficient reciprocity to extrapolate the remaining steering vectors, station 1 may set its antenna array to the omni receive pattern mode omni$_{RX}$ in state 990, and station 2 may transmit a sequence 992 of training data units while switching the steering vector u upon transmitting each BFT packet in the sequence 992. Similar to station 1, station 2 may include a sequence number or another type of an identifier in each BFT packet so that station 1 may reply with the best one or several identifiers in a message 994. The message 994 may be sent in a default packet or a BFT packet, for example. Also similar to the message 980 discussed above, the message 994 may include a request to initiate an Rx sector sweeping procedure at station 1 as well as the number $N_1$ of BFT packets to be transmitted to station 1 during the Rx sector sweeping procedure. Upon receiving the message 994, station 2 can identify the transmit steering vector $u_{TX}^2$, apply the transmit steering vector $u_{TX}^2$ to its antenna array, and begin transmitting $N_1$ BFT packets to station 1 as a sequence 998. Using the techniques discussed above and based on some or all of the $N_1$ BFT packets, station 1 may then determine the receive steering vector $u_{RX}^1$.

Figure 4:
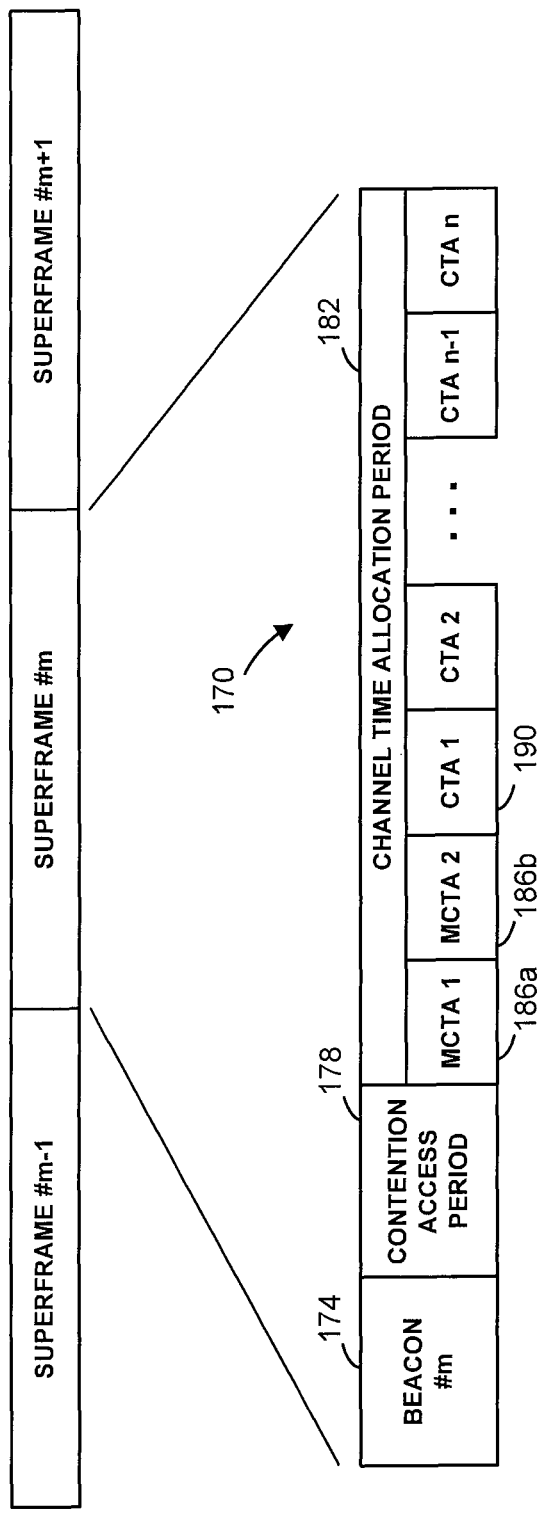
FIG. 4 is a diagram of a prior art superframe format.

In some embodiments, each procedure for determining a respective vector $u_{RX}^1$, $u_{RX}^2$, $u_{TX}^2$, or $u_{TX}^1$ may occupy a separate timeslot so that the method 970, absent sufficiently good calibration of stations 1 and 2, occupies four timeslots. In other embodiments, the entire bidirectional Tx and Rx sweeping procedure of the method 970 may be implemented in a single timeslot, pre-allocated by a network controller or negotiated by one or both of the stations in real time. Further, it will be noted that some of the messages discussed with reference to FIG. 4 may be separated. For example, stations 1 and 2 may report feedback related to Tx sector sweeping separately from request Rx sector sweeping.

Further with respect to FIG. 33, a pair of devices (e.g., the transmitter 12 and the receiver 14 of FIG. 1) in which only one of the devices is equipped with multiple antennas may easily bypass some of the stages or steps of the method 970 by controlling parameters in the messages 980 or 994, for example. In particular, to indicate to station 1 that station 2 does not require an Rx sector sweeping procedure (because station 2 has only one antenna), station 2 may set the IE that specifies $N_2$ to zero. Further, station 1 may retain this information for the duration of the method 970 so as to omit both the Rx sector sweeping at station 2 and Tx sector sweeping at station 2 (sequence 992). Of course, stations 1 and 2 may also choose to set $N_1$ or $N_2$ to zero when multiple antennas are available but the sector sweeping procedure is not desired.

FIG. 34 is a timing diagram of a method 1000 largely similar to the method 970, except that stations 1 and 2 conduct multiple iterations (or "sweeps") of beamforming using sector sweeping when implementing the method 1000. Thus, sweep 1 may include the same states and message exchanges as the entire procedure of method 970. However, sweep 1 of the method 100 may include a smaller number of sectors (i.e., vectors u and, correspondingly, training data units d). In this sense, sweep 1 may be a "coarse" sweep or iteration of the method 1000. In the next sweep, stations 1 and/or 2 may refine the range of sectors in view of the previous iteration. For example, station 1 may use the results of the first sweep to calculate an approximate range in which the subsequent one or more sweeps should occur. In this manner, stations 1 and 2 may gradually develop efficient values for transmit and receive steering vectors. It will be also noted that iterative sweeping of the method 1000 may be conducted in one timeslot or over a period spanning multiple timeslots.

FIG. 35 is a timing diagram of another example method 1050 for a joint bidirectional Tx and Rx sector sweeping. In state 1052, station 2 may set its antenna array to an omni receive pattern mode omni$_{RX}$ in preparation for a Tx beamforming by sector sweeping procedure which station 1 initiates to determine the transmit steering vector $u_{TX}^1$. Station 1 may then transmit a sequence 1056 of BFT packets which may be similar to the sequence 976 discussed above with reference to FIG. 33. The sequence 1056 may include data units of equal size spaced apart at equal intervals (e.g., IFS) and having an identifier such as a sequence number, and station 1 switches the steering vector u after transmitting each BFT packet in the sequence 1056. However, unlike the sequence 976, each BFT packet in the sequence 1056 may include an IE that identifies a request to initiate an Rx sweep procedure at station 1 and specifies a number of BFT packets to be transmitted during the procedure.

Next, station 1 may set its antenna array to an omni receive pattern mode in or immediately prior to state 1058. In contrast to the embodiment discussed with reference to FIG. 33, station 2 may initiate a Tx sweep procedure by sending a sequence 1062 of BFT packets (while iteratively switching the steering vector u) that include an E specifying the feedback to the Tx sector sweeping procedure of station 1 (e.g., an identifier of a best received BFT packet), as well as an additional IE that indicates an Rx sector sweep request at station 2, possibly specifying a number of desired BFT packets in the requested Rx sector sweep procedure.

Upon processing the sequence 1062, station 1 may respond to station 2 with a feedback message 1066 carrying a feedback for the Tx sector sweeping procedure at station 2. The feedback message 1066 may be included in a default packet or a BFT packet, for example. Station 1 may also select and apply the transmit steering vector to its antenna array. Additionally, the feedback message 1066 may include an IE indicating a confirmation to the Rx sweep request from station 2. The confirmation IE may specify the number of BFT packets station 1 is planning to send to station 2. It is contemplated that in most situations, the number in the confirmation IE would match the number in the data units sent in the sequence 1062. In this manner, station 2 receives an explicit acknowledgement to the Rx sweep request, and can further rely on the feedback message 1066 to synchronize the timing of subsequent Rx sector sweep BFT packets.

Station 2 may then set its antenna array to the omni receive pattern mode in state 1070. Similarly, station 1 may apply the omni receive pattern mode to its antenna array upon transmitting the feedback message 1066. Upon processing the feedback message 1066, station 2 may reply with a similar feedback message 1068 to synchronize with the Rx sweep request from station 1. However, it will be noted that messages 1066 and 1068 are optional.

In state 1070, station 1 may apply the selected Tx transmit steering vector to its antenna array and transmit a series 1074 of BFT packets. Similar to the optional messages 1066 and 1068, stations 1 and 2 may exchange optional messages 1076 and 1078 to confirm the number of BFT packets station 1 will send to station 2 (message 1076) and acknowledge that station 1 is ready to receive BFT packets as a part of the Rx sector sweep procedure at station 1 (message 1078). As indicated above, these optional messages allow stations 1 and 2 to synchronize in preparation for a sector sweeping procedure. It will be appreciated that this synchronization is particularly important when switching from a transmit mode to a receive mode, for example, is relatively time-consuming, or when there is a risk of a clock drift at station 1 or station 2. Further, if stations 1 and 2 do not use messages 1066 and 1068 or 1076 and 1078, the Tx/Rx and Rx/Tx turnaround times (i.e., the time it takes a station to switch between transmit and receive modes) may need to be fixed at both stations 1 and 2, as well made known to the respective other station.

In another embodiment, the message 1066 may additionally include an Rx sector sweep request from station 1. In this case, the message 1068 may accordingly include a confirmation to the Rx sector sweep request, while the sequence 1056 need not include an Rx sector sweep request. It is noted that this implementation will effectively reduce the number of packets that specify the Rx sector sweep request.

A transmitter may transmit information to a receiver that indicates a data unit is a BFT data unit as opposed to a regular data unit and/or a control PHY data unit in a variety of ways as discussed above. For example, the transmitter may signal to the receiver that a data unit is a BFT data unit by, for example, previously sending another data unit that indicates the next data unit, a data unit transmitted at a certain time, etc., is a BFT data unit. Referring to FIG. 2, a MAC controller (not shown), for example, may cause the transmitter 12 to transmit a data unit that indicates a subsequent data unit is a BFT data unit. Also, the transmitter may generate the BFT data unit to include signaling information in the BFT data unit itself by, for example, using a different spreading technique in the preamble, using a different modulation technique in the preamble, setting a field in the PHY header to a certain value, etc.

In embodiments in which the BFT data unit is a type of control PHY data unit and in which the BFT data unit format specifies a fixed length payload, if the payload length of a BFT data unit is the same as other types of control PHY data units, it may not be necessary for the transmitter to transmit information to the receiver to indicate that a data unit is a BFT data unit as opposed to a control PHY data unit. In this case, the preamble, header and data specified by the BFT format may be the same as other types of control PHY data units.

If, however, the payload length of the BFT data unit format is too short so that a received data unit ends before the PHY header may be decoded by the receiver (i.e., the received data unit ends before the receiver is able to determine when the data unit should end), for example, then the transmitter should transmit information to the receiver to indicate that the data unit is a BFT data unit as opposed to a regular control PHY data unit. For example, the transmitter may signal to the receiver that a data unit is a BFT data unit by, for example, previously sending another data unit that indicates the next data unit, a data unit transmitted at a certain time, etc., is a BFT data unit. This may be accomplished with MAC layer "handshaking" for example. For instance, MAC layer processes on the transmitter and receiver may exchange information so that the receiver knows when to expect BFT data units. Also, the transmitter may generate the BFT data unit to include signaling information in the BFT data unit itself by, for example, using a different spreading technique in the preamble, using a different modulation technique in the preamble, setting a field in the PHY header to a certain value, etc.

Figure 36:
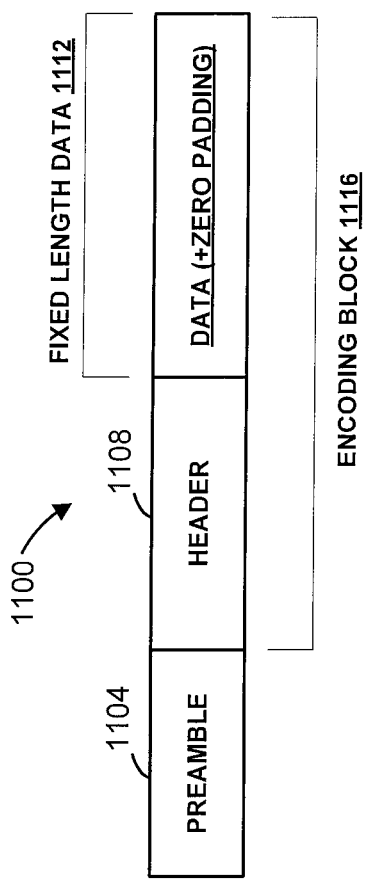
FIG. 36 is a diagram of an example BFT data unit format.

FIG. 36 is a block diagram of a BFT data unit 1100 that includes a preamble 1104, a PHY header 1108, and a fixed length payload 1112. The header 1108 and the payload 1112 are encoded using a block encoding technique such as low density parity check (LDPC) encoding, Reed-Solomon encoding, etc. The header 1108 and the payload 1112 may be encoded as a block 1116. If the BFT data is short such that it does not fill the allotted space in the fixed length payload 1112, the payload 1112 may be padded with zeros prior to encoding. In this embodiment, there may be a delay between when the data unit 1100 ends and when the receiver is able to decode the block 1116 and recover the data in the header 1108. Thus, the receiver does not decode the header 1108 until the end of the data unit 1100 has already occurred. In such situations, the transmitter should send to the receiver information that indicates the packet is a BFT packet using techniques such as described above.

Figure 37:
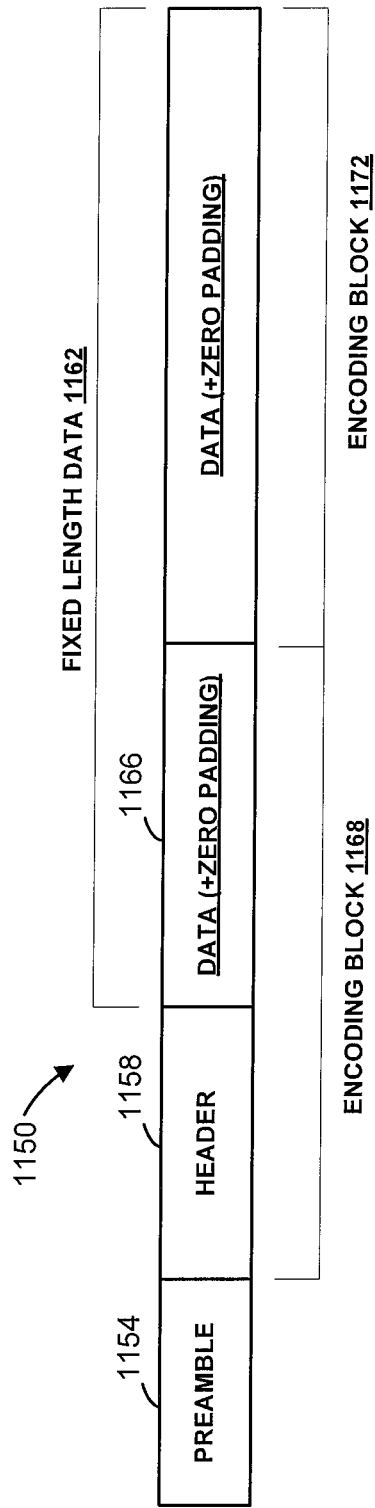
FIG. 37 is a diagram of another example BFT data unit format.

FIG. 37 is a block diagram of a BFT data unit 1150 that includes a preamble 1154, a PHY header 1158, and a fixed length payload 1162. The header 1158 and the payload 1162 are encoded using a block encoding technique such as low density parity check (LDPC) encoding, Reed-Solomon encoding, etc. The header 1108 and a first portion 1166 of the payload 1112 may be encoded as a first block 1168. A second portion of the of the payload 1112 may be encoded as a second block 1172. In this embodiment, the receiver is able to decode the block 1168 and recover the data in the header 1158 prior to the end of the data unit 1150 occurs. In such situations, it may not be necessary for the transmitter to send to the receiver information that indicates the packet is a BFT packet.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

Although the forgoing text sets forth a detailed description of numerous different embodiments, it should be understood that the scope of the patent is defined by the words of the claims set forth at the end of this patent. The detailed description is to be construed as exemplary only and does not describe every possible embodiment because describing every possible embodiment would be impractical, if not impossible. Numerous alternative embodiments could be implemented, using either current technology or technology developed after the filing date of this disclosure, which would still fall within the scope of the claims.

What is claimed is:

1. In a wireless communication system wherein communication devices exchange information utilizing data units that conform to a first format, a method for transmitting a beamforming training (BFT) data unit that conforms to a second format, wherein a length of the BFT data unit is shorter than lengths supported by the first format, wherein the BFT data unit is for transmitting beamforming training information, the method comprising:
generating a first portion of the BFT data unit to indicate to a receiving device that the BFT data unit conforms to the second format, wherein the first portion of the BFT data unit includes a preamble and at least a beginning portion of a physical layer (PHY) header, wherein the PHY header conforms to the first format;
generating a second portion of the BFT data unit according to the second format, wherein the second portion of the BFT data unit includes a payload that does not conform to the first format, and wherein the payload includes BFT information elements;
generating the BFT data unit to include the first portion and the second portion; and
causing the BFT data unit to be transmitted to the receiving device.

2. A method according to claim 1, wherein generating the first portion of the BFT data unit to indicate the BFT data unit conforms to the second format comprises generating the preamble to indicate the BFT data unit conforms to the second format.

3. A method according to claim 2, wherein generating the preamble to indicate the BFT data unit conforms to the second format comprises modifying modulation of the preamble as compared to the first format.

4. A method according to claim 3, wherein modifying modulation of the preamble as compared to the first format comprises rotating modulation of the preamble as compared to the first format.

5. A method according to claim 2, wherein generating the preamble to indicate the BFT data unit conforms to the second format comprises spreading a short training field (STF) of the preamble using a different spread code than used in the first format.

6. A method according to claim 2, wherein generating the preamble to indicate the BFT data unit conforms to the second format comprises spreading a short training field (STF) of the preamble using a different cover code than used in the first format.

7. A method according to claim 1, wherein generating the first portion of the BFT data unit to indicate the BFT data unit conforms to the second format comprises generating the PHY header to indicate the BFT packet conforms to the second format.

8. A method according to claim 7, wherein generating the PHY header to indicate the BFT packet conforms to the second format comprises setting at least one field in the PHY header to indicate the BFT packet conforms to the second format.

9. A method according to claim 1, wherein generating the second portion of the BFT data unit according to the second format comprises generating the PHY header to include BFT information elements not specified by the first format.

10. A method according to claim 9, wherein the first format specifies a media access control (MAC) header; wherein the payload is a fixed-length payload that omits at least some of the MAC header specified by the first format.

11. In a wireless communication system wherein communication devices exchange information utilizing data units that conform to a first format, a method for transmitting a beamforming training (BFT) data unit that conforms to a second format, wherein the BFT data unit is for transmitting beamforming training information, and wherein the second format comprises two or more sub-formats, the method comprising:
generating a first portion of the BFT data unit to include a preamble and at least a portion of a physical layer (PHY) header, wherein the first portion conforms to the first format, and wherein generating the first portion includes setting at least one field in the PHY header to indicate that the BFT packet conforms to one of the sub-formats;
generating a second portion of the BFT data unit according to the one of the sub-formats, wherein the second portion includes BFT information elements;
generating the BFT data unit to include the first portion and the second portion; and
causing the BFT data unit to be transmitted to the receiving device.

12. A method according to claim 11, wherein a first sub-format includes a payload and a second sub-format omits the payload.

13. In a wireless communication system wherein communication devices exchange information utilizing data units that conform to a first format, a method for processing a beamforming training (BFT) data unit that conforms to a second format, wherein a length of the BFT data unit is shorter than lengths supported by the first format, wherein the BFT data unit is for transmitting BFT information, the method comprising:
analyzing a first portion of a received data unit to determine if the received data unit is a BFT data unit, wherein the first portion of the received data unit includes a preamble and at least a beginning portion of the PHY header, wherein the PHY header conforms to the first format;
in response to determining that the received data unit is a BFT data unit, processing the received data unit according to the second format, wherein processing the received data unit includes analyzing a second portion of the data unit, wherein the second portion includes a payload that i) does not conform to the first format and ii) includes BFT information elements; and
utilizing the BFT information elements in the received data unit to perform a BFT function.

14. A method according to claim 13, wherein analyzing the first portion of the received data unit to determine if the received data unit is a BFT data unit comprises analyzing modulation of the preamble to determine if the modulation conforms to the second format.

15. A method according to claim 14, wherein analyzing modulation of the preamble to determine if the modulation conforms to the second format comprises determining if modulation of the preamble is rotated as compared to the first format.

16. A method according to claim 13, wherein analyzing the first portion of the received data unit to determine if the received data unit is a BFT data unit comprises determining if a short training field (STF) of the preamble was spread using a different spread code than used in the first format.

17. A method according to claim 13, wherein analyzing the first portion of the received data unit to determine if the received data unit is a BFT data unit comprises determining if the STF of the preamble was spread using a different cover code than used in the first format.

18. A method according to claim 13, wherein analyzing the first portion of the received data unit to determine if the received data unit is a BFT data unit comprises analyzing the PHY header to determine if the received data unit conforms to the second format.

19. A method according to claim 18, wherein analyzing the PHY header to determine if the received data unit conforms to the second format comprises detecting whether at least one field in the PHY header indicates the received data unit conforms to the second format.

20. A method according to claim 13, wherein utilizing BFT information elements in the second portion of the BFT data unit comprises utilizing BFT information elements in the PHY header, wherein the BFT information elements in the PHY header are not specified by the first format.

21. A method according to claim 13, wherein the first format specifies a media access control (MAC) header;

wherein the payload is a fixed-length payload that omits at least some of the MAC header specified by the first format.

22. In a wireless communication system wherein communication devices exchange information utilizing data units that conform to a first format, a method for processing a beamforming training (BFT) data unit that conforms to a second format, wherein the BFT data unit is for transmitting BFT information, and wherein the second format comprises two or more sub-formats, the method comprising:

analyzing a PHY header included in a first portion of a received data unit to detect whether at least one field in the PHY header indicates the received data unit conforms to one of the sub-formats;

in response to determining that the received data unit conforms to one of the sub-formats, processing the received data unit according to the one of the sub-formats, wherein processing the received data unit includes obtaining BFT information elements from a second portion of the data unit, wherein the second portion includes a payload that i) does not conform to the first format and ii) includes BFT information elements; and utilizing the BFT information elements in the received data unit to perform a BFT function.

23. A communication device for use in a wireless communication system, wherein the communication device exchanges information with other communication devices utilizing data units that conform to a first format, and utilizing a beamforming training (BFT) data unit that conforms to a second format, wherein a length of the BFT data unit is shorter than lengths supported by the first format, wherein the BFT data unit is for transmitting BFT information, the communication device comprising:

a controller configured to:

generate a first portion of the BFT data unit to indicate to a receiving device that the BFT data unit conforms to the second format, wherein the first portion of the BFT data unit includes a preamble and at least a beginning portion of a physical layer (PHY) header, wherein the PHY header conforms to the first format, generate a second portion of the BFT data unit according to the second format, wherein the second portion of the BFT data unit includes a payload that does not conform to the first format, and wherein the payload includes BFT information elements, generate the BFT data unit to include the first portion and the second portion, and cause the BFT data unit to be transmitted to the receiving device.

* * * * *